(12) United States Patent
Freda et al.

(10) Patent No.: US 12,114,309 B2
(45) Date of Patent: Oct. 8, 2024

(54) HANDLING USER PLANE IN WIRELESS SYSTEMS

(71) Applicant: InterDigital Patent Holdings, Inc., Wilmington, DE (US)

(72) Inventors: Martino M. Freda, Laval (CA); Ghyslain Pelletier, Montreal (CA); Paul Marinier, Brossard (CA); Diana Pani, Montreal (CA); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 256 days.

(21) Appl. No.: 17/581,569

(22) Filed: Jan. 21, 2022

(65) Prior Publication Data

US 2022/0150934 A1 May 12, 2022

Related U.S. Application Data

(63) Continuation of application No. 16/087,678, filed as application No. PCT/US2017/024778 on Mar. 29, 2017, now Pat. No. 11,265,901.

(Continued)

(51) Int. Cl.
*H04W 72/20* (2023.01)
*H04L 47/28* (2022.01)
(Continued)

(52) U.S. Cl.
CPC ........... *H04W 72/20* (2023.01); *H04L 47/286* (2013.01); *H04W 4/80* (2018.02);
(Continued)

(58) Field of Classification Search
CPC ....... H04W 72/20; H04W 4/80; H04W 72/21; H04W 72/23; H04W 26/0268; H04L 47/286
See application file for complete search history.

(56) References Cited

U.S. PATENT DOCUMENTS 7,061,929 B1 6/2006 Eberle et al.
9,345,019 B2 5/2016 Chou et al.
(Continued)

FOREIGN PATENT DOCUMENTS

CN 102415187 A 4/2010
CN 102612093 A 7/2012
(Continued)

OTHER PUBLICATIONS

3rd Generation Partnership Project (3GPP), R1-155801, "Overview on Design of Uplink for NB-IoT", LG Electronics, 3GPP TSG RAN WG1 Meeting #82-bis, Malmo, Sweden, Oct. 5-9, 2015, 6 pages.
(Continued)

*Primary Examiner* — Ronald B Abelson
(74) *Attorney, Agent, or Firm* — Flaster Greenberg, P.C.

(57) ABSTRACT

Systems, methods and instrumentalities may be provided for handling a user plane in a wireless communication system. The wireless communication system may be characterized by a flexible air interface. One aspect of the flexible air interface is that transmissions by a wireless transmit/receive unit (WTRU) in the system may have different quality of service (QoS) requirements, such as different latency requirements. The WTRU may adjust its behaviors based on the QoS requirements, e.g., by utilizing preconfigured resources, resource requests, self-scheduling, and/or the like, such that the transmissions may be performed in accordance with their respective QoS requirements.

18 Claims, 10 Drawing Sheets

Related U.S. Application Data

(60) Provisional application No. 62/315,373, filed on Mar. 30, 2016.

(51) Int. Cl.
*H04W 4/80* (2018.01)
*H04W 28/02* (2009.01)
*H04W 72/21* (2023.01)
*H04W 72/23* (2023.01)

(52) U.S. Cl.
CPC ....... *H04W 28/0268* (2013.01); *H04W 72/21* (2023.01); *H04W 72/23* (2023.01)

(56) References Cited

U.S. PATENT DOCUMENTS

| | | | |
|---|---|---|---|
| 9,723,596 | B2 | 8/2017 | Zhang et al. |
| 9,788,358 | B2 | 10/2017 | Pelletier et al. |
| 9,807,795 | B2 | 10/2017 | Jeong et al. |
| 9,844,071 | B2 | 12/2017 | Ostergaard et al. |
| 2002/0137520 | A1 | 9/2002 | Dillon et al. |
| 2004/0162083 | A1 | 8/2004 | Chen et al. |
| 2005/0222884 | A1 | 10/2005 | Ehret et al. |
| 2007/0275728 | A1* | 11/2007 | Lohr .................. H04W 72/566 |
| 2009/0116434 | A1 | 5/2009 | Lohr et al. |
| 2009/0225711 | A1 | 9/2009 | Sammour et al. |
| 2009/0268707 | A1 | 10/2009 | Pani et al. |
| 2010/0135229 | A1 | 6/2010 | Loehr et al. |
| 2011/0310759 | A1 | 12/2011 | Gerstenberger et al. |
| 2012/0120880 | A1 | 5/2012 | Lee et al. |
| 2012/0281566 | A1 | 11/2012 | Pelletier et al. |
| 2013/0242730 | A1 | 9/2013 | Pelletier et al. |
| 2014/0036808 | A1 | 2/2014 | Pelletier et al. |
| 2014/0056278 | A1* | 2/2014 | Marinier ............. H04W 72/044 |
| 2014/0126527 | A1 | 5/2014 | Xiong et al. |
| 2014/0128092 | A1 | 5/2014 | Kiong et al. |
| 2014/0133410 | A1 | 5/2014 | Nguyen et al. |
| 2014/0198677 | A1 | 7/2014 | Xu et al. |
| 2014/0269767 | A1 | 9/2014 | Djukic et al. |
| 2015/0087414 | A1 | 3/2015 | Chen et al. |
| 2015/0103703 | A1 | 4/2015 | Zeng et al. |
| 2015/0117342 | A1 | 4/2015 | Loehr et al. |
| 2015/0124743 | A1 | 5/2015 | Damnjanovic et al. |
| 2015/0156769 | A1 | 6/2015 | Mazzarese et al. |
| 2015/0180786 | A1 | 6/2015 | Chen et al. |
| 2015/0271809 | A1 | 9/2015 | Kato et al. |
| 2015/0282213 | A1 | 10/2015 | Sun et al. |
| 2016/0020891 | A1 | 1/2016 | Jung et al. |
| 2016/0021581 | A1 | 1/2016 | Deenoo et al. |
| 2016/0050680 | A1 | 2/2016 | Simonsson et al. |
| 2016/0066316 | A1 | 3/2016 | Bhushan et al. |
| 2016/0183276 | A1 | 6/2016 | Marinier et al. |
| 2016/0192354 | A1 | 6/2016 | Wei et al. |
| 2016/0233986 | A1 | 8/2016 | Lee et al. |
| 2017/0079059 | A1 | 3/2017 | Li et al. |
| 2017/0164238 | A1 | 6/2017 | Paredes Cabrera et al. |
| 2017/0215170 | A1 | 7/2017 | Islam et al. |
| 2017/0290008 | A1 | 10/2017 | Tooher |
| 2018/0048498 | A1 | 2/2018 | Stern-Berkowitz et al. |
| 2018/0124802 | A1* | 5/2018 | Yi ......................... H04L 5/0064 |
| 2018/0249513 | A1 | 8/2018 | Chang et al. |
| 2018/0317254 | A1* | 11/2018 | Hu .................... H04W 72/1268 |
| 2018/0376474 | A1 | 12/2018 | Khoryaev et al. |
| 2019/0124674 | A1 | 4/2019 | Lee et al. |

FOREIGN PATENT DOCUMENTS

| | | |
|---|---|---|
| EP | 2182770 A2 | 5/2010 |
| EP | 2241124 A1 | 10/2010 |
| EP | 2744290 A1 | 6/2014 |
| JP | 2012-157036 A | 8/2012 |
| JP | 2015-520533 A | 7/2015 |
| JP | 2015-530042 A | 10/2015 |
| JP | 2017-533620 A | 11/2017 |
| RU | 2391795 C2 | 6/2010 |
| RU | 2517434 C2 | 5/2014 |
| TW | 201521487 A | 6/2015 |
| WO | 2007/092245 A2 | 8/2007 |
| WO | 2008/024283 A2 | 2/2008 |
| WO | WO 2009/087920 A1 | 7/2009 |
| WO | WO 2010/121708 A1 | 10/2010 |
| WO | 2011/100681 A1 | 8/2011 |
| WO | 2013/139299 A1 | 9/2013 |
| WO | 2013/181515 A2 | 12/2013 |
| WO | 2014/031989 A1 | 2/2014 |
| WO | 2014/054568 A1 | 4/2014 |
| WO | 2016/040290 A1 | 3/2016 |

OTHER PUBLICATIONS

3rd Generation Partnership Project (3GPP), R1-157370, "UL Numerology and Frame Structure Design", MediaTek Inc., 3GPP TSG RAN WG1 Meeting #83, Anaheim, USA, Nov. 15-22, 2015, pp. 1-4.

3rd Generation Partnership Project (3GPP), R2-062226, "Improved QoS Handling for UL Scheduling", Lucent Technologies, 3GPP TSG-RAN WG2 Meeting #54, Tallinn, Estonia, Aug. 28-Sep. 1, 2006, 4 pages.

3rd Generation Partnership Project (3GPP), R2-151455, "MAC Impact for Supporting UL Transmission on LAA SCell", Fujitsu, 3GPP TSG-RAN WG2 Meeting#89bis, Bratislava, Slovakia, Apr. 20-24, 2015, pp. 1-5.

3rd Generation Partnership Project (3GPP), TR 38.913 V0.2.0, "Technical Specification Group Radio Access Network, Study on Scenarios and Requirements for Next Generation Access Technologies, (Release 14)", Feb. 2016, pp. 1-19.

3rd Generation Partnership Project (3GPP), TS 36.213 V13.0.1, "Technical Specification Group Radio Access Network, Evolved Universal Terrestrial Radio Access (E-UTRA), Physical Layer Procedures (Release 13)", Jan. 2016, pp. 1-326.

3rd Generation Partnership Project (3GPP), TS 36.300 V12.8.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 12)", Dec. 2015, pp. 1-254.

3rd Generation Partnership Project (3GPP), TS 36.300 V13.2.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 13)", Dec. 2015, pp. 1-290.

3rd Generation Partnership Project (3GPP), TS 36.321 V13.0.0, "Technical Specification Group Radio Access Network, Evolved Universal Terrestrial Radio Access (E-UTRA), Medium Access Control (MAC) Protocol Specification (Release 13)", Dec. 2015, pp. 1-82.

3rd Generation Partnership Project (3GPP), TS 36.321 V8.12.0, "Technical Specification Group Radio Access Network, Evolved Universal Terrestrial Radio Access (E-UTRA), Medium Access Control (MAC) Protocol Specification (Release 8)", Mar. 2012, pp. 1-47.

3rd Generation Partnership Project (3GPP), TS 36.331 V12.8.0, "Technical Specification Group Radio Access Network, Evolved Universal Terrestrial Radio Access (E-UTRA), Radio Resource Control (RRC), Protocol Specification Release 12)", Dec. 2015, pp. 1-456.

3GPP TS 25.306 V12.5.0 , "Technical Specification Group Radio Access Network; UE Radio Access capabilities (Release 12)", 3rd Generation Partnership Project (3GPP), Mar. 2015,, 75 pages.

3GPP TS 25.306 V6.13.0 , "Technical Specification Group Radio Access Network; UE Radio Access capabilities (Release 6)", 3rd Generation Partnership Project (3GPP), Mar. 2009, 34 pages.

3GPP TS 25.321 V12.2.0 , "Technical Specification Group Radio Access Network; Medium Access Control (MAC) protocol specification (Release 12)", 3rd Generation Partnership Project (3GPP), Dec. 2014, 214 pages.

(56) References Cited

OTHER PUBLICATIONS

3GPP TS 25.321 V6.18.0 , "Technical Specification Group Radio Access Network; Medium Access Control (MAC) protocol specification (Release 6)", 3rd Generation Partnership Project (3GPP), Mar. 2009, 95 pages.

3GPP TS 25.331 V12.7.0 , "Technical Specification Group Radio Access Network; Radio Resource Control (RRC); Protocol specification (Release 12)", 3rd Generation Partnership Project (3GPP), Sep. 2015, 1503 pages.

3GPP TS 25.331, V6.26.0 , "Technical Specification Group Radio Access Network; Radio Resource Control (RRC); Protocol Specification (Release 6)", 3rd Generation Partnership Project (3GPP), Dec. 2011, 1254 pages.

* cited by examiner

HANDLING USER PLANE IN WIRELESS SYSTEMS

CROSS-REFERENCE TO RELATED APPLICATIONS

This application is a continuation of U.S. patent application Ser. No. 16/087,678, filed Sep. 24, 2018, which is the National Stage Entry under 35 U.S.C. § 371 of Patent Cooperation Treaty Application No. PCT/US2017/024778, filed Mar. 29, 2017, which claims the benefit of provisional U.S. patent application No. 62/315,373, filed Mar. 30, 2016, the disclosure of which is incorporated herein by reference in its entirety.

BACKGROUND

Mobile communications are in continuous evolution and is already at the doorstep of its fifth incarnation—5G. 5G network may be built on flexible radio access technologies. As these new technologies emerge, challenges arise in determining how to support a wide variety of usage cases with differing characteristics.

SUMMARY

Systems, methods and instrumentalities are disclosed herein for transmitting uplink data from a wireless transmit/receive unit (WTRU) to a network. The uplink data may include an uplink data unit (e.g., an uplink data packet), and the transmission of the uplink data unit may be performed in a manner that satisfies a specific quality of service (QoS) requirement. The QoS requirement may be a timing requirement. For example, the QoS requirement may be that the uplink data unit be transmitted with relatively low latency.

The WTRU may maintain a time-to-live (TTL) parameter to monitor the transmission latency of the uplink data unit. For example, the value of the TTL parameter may be reflective of an amount of time elapsed since the uplink data unit became available for transmission and/or an amount of time remaining before the uplink data unit is supposed to be successfully transmitted. The WTRU may determine, based on the QoS requirement, a threshold value for the TTL parameter, attempt to transmit the uplink data unit using a first transmission mode, and determine that the value of the TTL parameter has reached a threshold value before a successful transmission can be accomplished. The WTRU may then try to transmit the uplink data unit using a second transmission mode, for example until the TTL parameter reaches expiration.

The second transmission mode may differ from the first transmission mode in one or more aspects. For example, the WTRU may transmit the uplink data unit in the second transmission mode using a pre-configured set of resources. The WTRU may receive such preconfigured resources, for example from a network. The network may have reserved the preconfigured resources for transmissions characterized by a particular QoS requirement, such as the QoS requirement associated with the pending uplink data unit. The network may specify that the pre-configured resources are to be shared by multiple WTRUs.

The WTRU may receive the pre-configured resources when the WTRU initially registers with the network. Alternatively or additionally, the WTRU may receive the pre-configured resources via dedicated signaling from the network (e.g., after the WTRU has already registered with the network). The WTRU may gain access to the pre-configured set of resources through an uplink transmission to the network. The uplink transmission may indicate a time at which the WTRU desires to use the pre-configured resources, for example. The WTRU may receive an acknowledgement from the network in response to the uplink transmission.

The WTRU may, in the second transmission mode, send uplink control information (UCI) to the network. The UCI may include a request for resources. The UCI may indicate the QoS requirement associated with the uplink data unit, or a numerology of the uplink data unit. The WTRU may receive a grant from the network in response to the UCI. The grant may indicate which resources the WTRU can use in the second transmission mode. Additionally or alternatively, the grant may specify a spectrum operation mode (SOM) or a transport channel that the WTRU can use in the second transmission mode. For example, the grant may specify a numerology and/or a waveform that the WTRU can use in the second transmission mode.

The WTRU may, in the second transmission mode, interrupt an existing hybrid automatic repeat request (HARQ) process to transmit the uplink data unit.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to be exemplary and in no way limit the scope of the application.

Figure 1A:
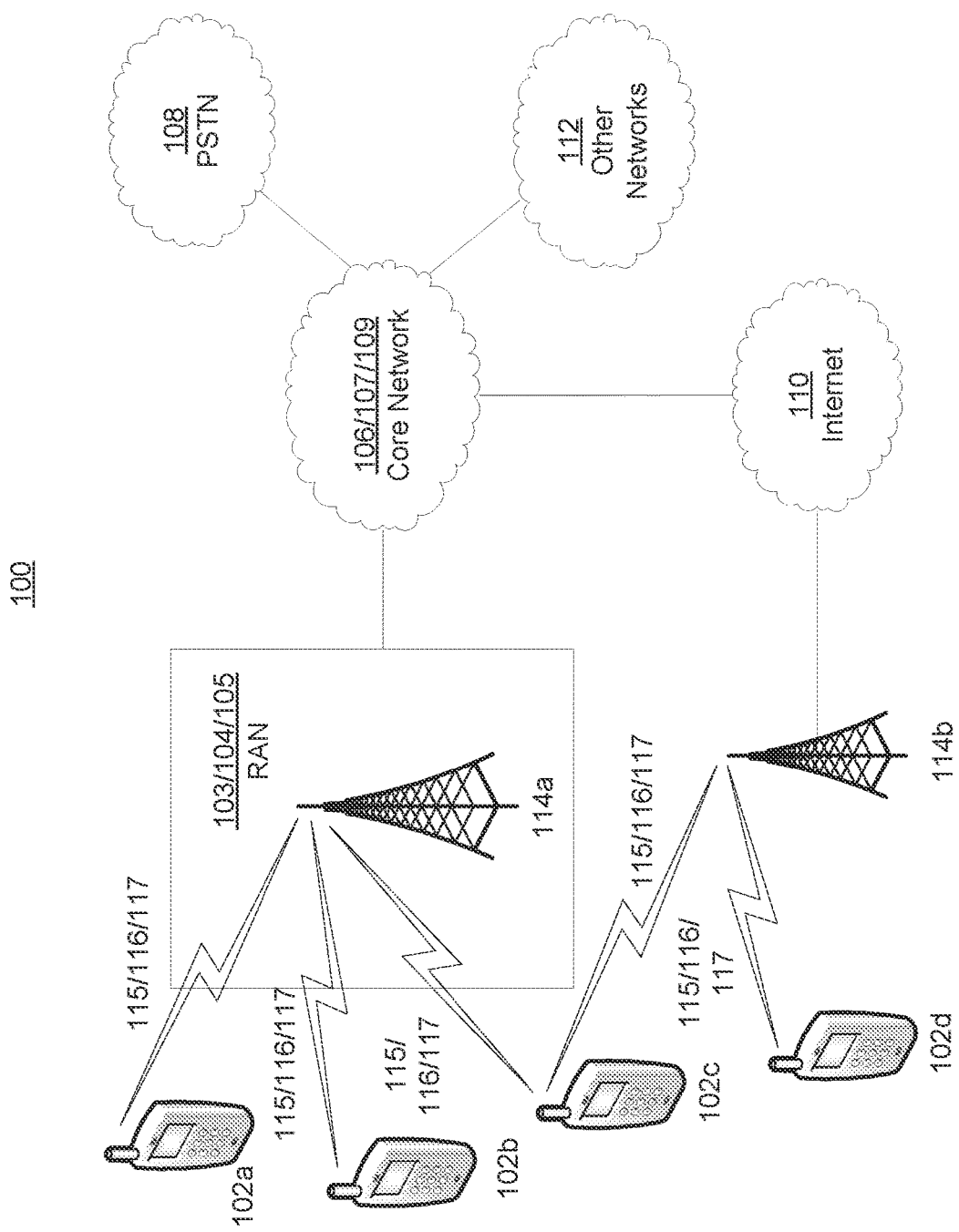
FIG. 1A is a system diagram of an example communications system in which one or more disclosed embodiments may be implemented.

The following abbreviations and acronyms will be used in the description of the example embodiments:

Δf Sub-carrier spacing
5gFlex 5G Flexible Radio Access Technology
5gNB 5GFlex NodeB
ACK Acknowledgement
BLER Block Error Rate
BTI Basic TI (in integer multiple of one or more symbol duration)
CB Contention-Based (e.g. access, channel, resource)
CoMP Coordinated Multi-Point transmission/reception
CP Cyclic Prefix
CP-OFDM Conventional OFDM (relying on cyclic prefix)
CQI Channel Quality Indicator
CN Core Network (e.g. LTE packet core)
CRC Cyclic Redundancy Check
CSI Channel State Information
CSG Closed Subscriber Group
D2D Device to Device transmissions (e.g. LTE Sidelink)
DCI Downlink Control Information
DL Downlink
DM-RS Demodulation Reference Signal
DRB Data Radio Bearer
EMBB Enhanced Mobile Broadband
EPC Evolved Packet Core
FBMC Filtered Band Multi-Carrier
FBMC/OQAM A FBMC technique using Offset Quadrature Amplitude Modulation
FDD Frequency Division Duplexing
FDM Frequency Division Multiplexing
FEC Forward Error Correction
ICC Industrial Control and Communications
ICIC Inter-Cell Interference Cancellation
IP Internet Protocol
LAA License Assisted Access
LBT Listen-Before-Talk
LCH Logical Channel
LCG Logical Channel Group
LCP Logical Channel Prioritization
LLC Low Latency Communications
LTE Long Term Evolution e.g. from 3GPP LTE R8 and up
MAC Medium Access Control
NACK Negative ACK
MBB Massive Broadband Communications
MC MultiCarrier
MCS Modulation and Coding Scheme
MIMO Multiple Input Multiple Output
MTC Machine-Type Communications
NAS Non-Access Stratum
OFDM Orthogonal Frequency-Division Multiplexing
OFDMA Orthogonal Frequency-Division Multiple Access
OOB Out-Of-Band (emissions)
PBR Prioritized Bit Rate
$P_{cmax}$ Total available UE power in a given TI
PHY Physical Layer
PRACH Physical Random Access Channel
PDU Protocol Data Unit
PER Packet Error Rate
PL Path Loss (Estimation)
PLMN Public Land Mobile Network
PLR Packet Loss Rate
PSS Primary Synchronization Signal
QoS Quality of Service (from the physical layer perspective)
RAB Radio Access Bearer
RACH Random Access Channel (or procedure)
RF Radio Front end
RNTI Radio Network Identifier
RRC Radio Resource Control
RRM Radio Resource Management
RS Reference Signal
RTT Round-Trip Time
SCMA Single Carrier Multiple Access
SDU Service Data Unit
SOM Spectrum Operation Mode
SS Synchronization Signal
SSS Secondary Synchronization Signal
SRB Signaling Radio Bearer
SWG Switching Gap (in a self-contained subframe)
TB Transport Block
TBS Transport Block Size
TDD Time-Division Duplexing
TDM Time-Division Multiplexing
TI Time Interval (in integer multiple of one or more BTI)
TTI Transmission Time Interval (in integer multiple of one or more TI)
TRP Transmission/Reception Point
TRx Transceiver
UFMC Universal Filtered MultiCarrier
UF-OFDM Universal Filtered OFDM
UL Uplink
URC Ultra-Reliable Communications
URLLC Ultra-Reliable and Low Latency Communications
V2V Vehicle to vehicle communications
V2X Vehicular communications
WLAN Wireless Local Area Networks and related technologies (IEEE 802.xx domain)
WTRU Wireless Transmit/Receive Unit FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), orthogonal frequency-division multiplexing with offset quadrature amplitude modulation (OFDM-OQAM), universal filtered orthogonal frequency-division multiplexing (UF-OFDM), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, networks, and/or network elements.

The communications systems 100 may also include a number of base stations, e.g., base station 114a and base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, OFDM-OQAM, UF-OFDM and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE), LTE-Advanced (LTE-A) and/or 5gFLEX.

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, 5gFLEX, etc.) to establish a picocell or femtocell. As shown in FIG. 1A, the base station 114b may have a direct connection to the Internet 110. Thus, the base station 114b may not be required to access the Internet 110 via the core network 106/107/109

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
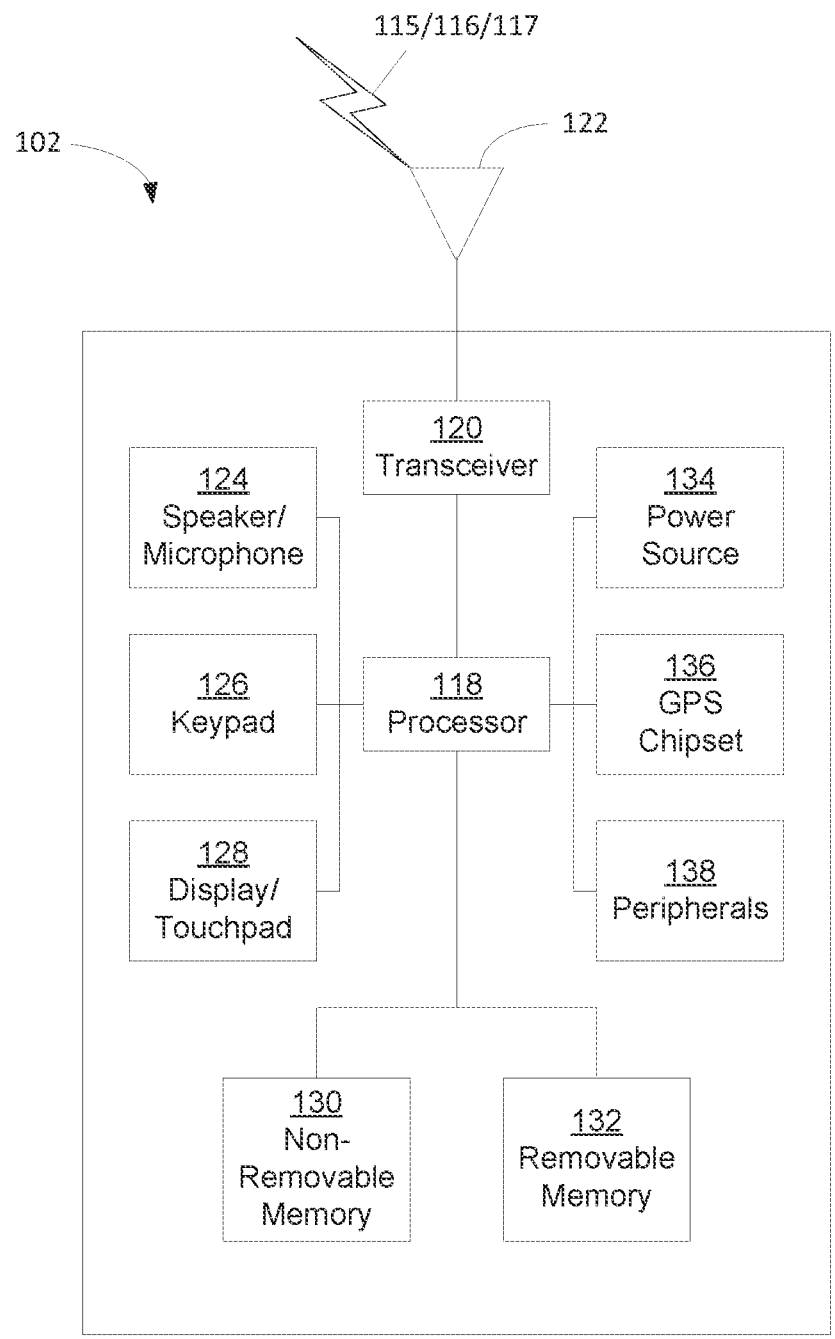
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRUs 102a, 102b, 102c, 102d may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 of the WTRU 102 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 of the WTRU 102 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 of the WTRU 102 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer.

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
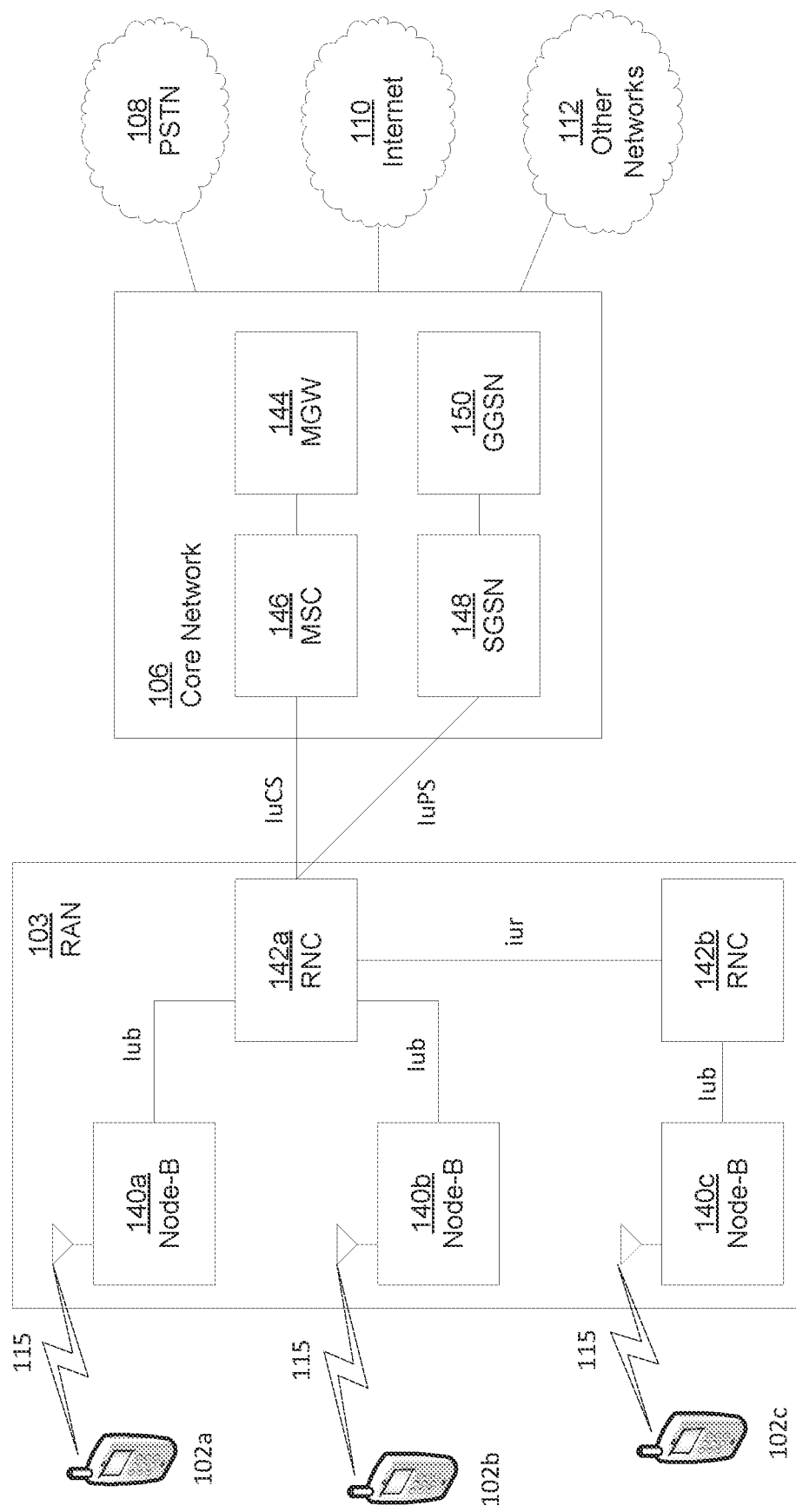
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
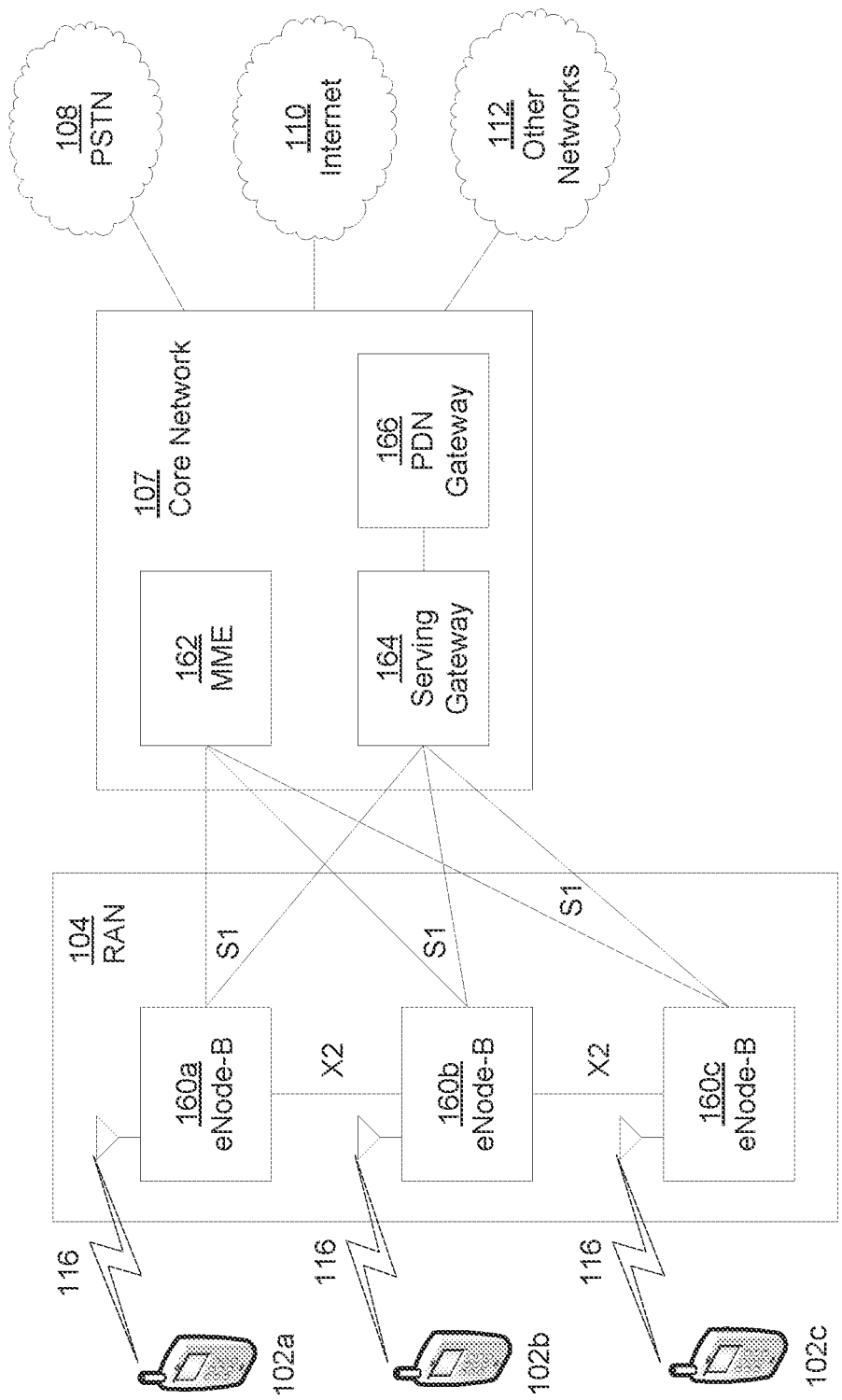
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
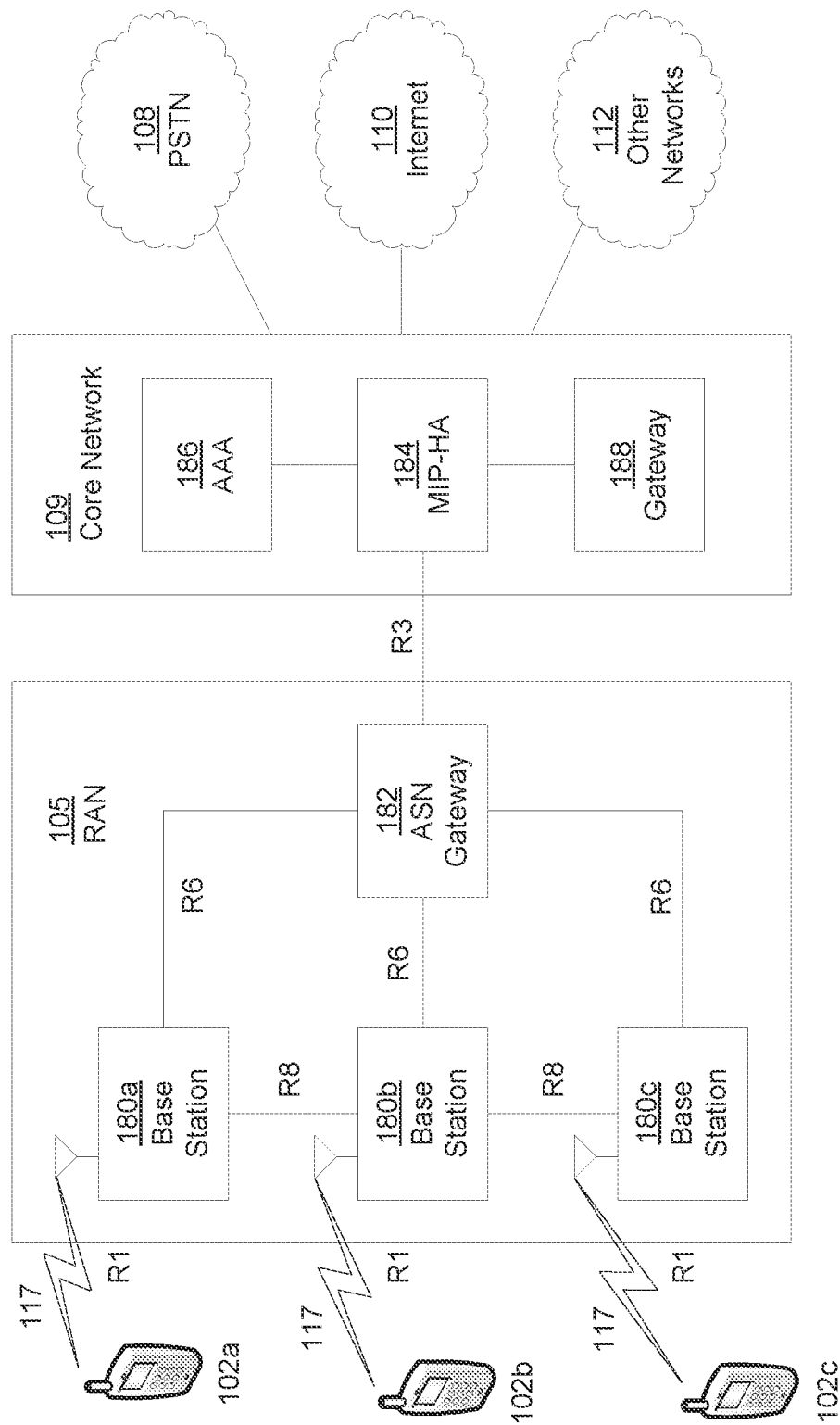
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The example communication system described herein may support an air interface with which one or more of the following may be enabled: improved broadband performance (IBB), industrial control and communications (ICC) and vehicular applications (V2X), and massive machine-type communications (mMTC). The air interface may support ultra-low latency communications (LLC), ultra-reliable communications (URC), and/or MTC operations (e.g., including narrow band operations). With respect to LLC, one or more of the following may be supported: a low air interface latency (e.g., 1ms RTT), a short TTI (e.g., between 100 us and 250 us), an ultra-low access latency (e.g., access latency may be associated with an amount of time from an initial system access to the completion of transmission of a first user plane data unit), and/or a low end-to-end (e2e) latency (e.g., less than 10 ms, e.g., in ICC and/or V2X). With respect to URC, transmission/communication reliability may approach, for example, 99.999% transmission success and/or service availability. Mobility for speed in the range of 0-500 km/hour may be desired. Packet loss ratio may be designed to be less than $10e^{-6}$ (e.g., in ICC and V2X). With respect to MTC operation, the air interface may support narrowband operations (e.g., using less than 200 KHz), extended battery life (e.g., up to 15 years of autonomy), and/or reduced communication overhead (e.g., at least for small and/or infrequent data transmissions such as those with a data rate in the range of 1-100 kbps and/or with an access latency of seconds to hours).

The example communication system described herein may utilize OFDM as a waveform (e.g., at least in the downlink). OFDM may be a basic signal format for data transmissions in LTE and/or IEEE 802.11. With OFDM, a spectrum may be divided into multiple parallel orthogonal subbands. A subcarrier may be shaped using a rectangular window in the time domain, which may lead to sinc-shaped subcarriers in the frequency domain. OFDMA may be designed to attempt to achieve high levels of frequency synchronization and/or uplink timing alignment within the duration of a cyclic prefix (e.g., to maintain orthogonality between signals and/or to minimize inter-carrier interference). The synchronization requirements of OFDM (e.g., conventional OFDM or CP-OFDM) may be challenging to meet in the example communication system designed to achieve the other design goals mention above (e.g., because a WTRU may be connected to multiple access points simultaneously). Additional power reduction may be applied to uplink transmissions to comply with spectral emission requirements to adjacent bands (e.g., in the presence of aggregation of fragmented spectrum for the WTRU's transmissions). In light of these challenges, the example communication system described herein may impose more stringent RF requirements for CP-OFDM (e.g., when a large amount of contiguous spectrum is used that does not rely on aggregation). If used, an CP-OFDM-based transmission scheme may lead to a downlink physical layer similar to that of a legacy system (e.g., with modifications to pilot signal density and location).

The example communication system described herein may utilize other waveforms. For example, a downlink transmission scheme in the example communication system may be based on a multicarrier (MC) waveform. The MC waveform may be characterized, for example, by high spectral containment (e.g., lower side lobes and/or lower OOB emissions). The MC waveform may divide a channel into subchannels and modulate data symbols on subcarriers in these subchannels. An example MC waveform is OFDM-OQAM. With OFDM-OQAM, a filter may be applied in the time domain (e.g., per subcarrier) to the OFDM signal, for example, to reduce OOB. OFDM-OQAM may cause low interference to adjacent bands, may not need large guard bands, and may not utilize a cyclic prefix. OFDM-OQAM may be a suitable FBMC technique. It should be noted, however, that in some example systems OFDM-OQAM may be sensitive to multipath effects and to high delay spread in terms of orthogonality. Equalization and channel estimation with OFDM-OQAM may be complicated.

Another example MC waveform that may be used is UFMC (UF-OFDM). With UFMC (UF-OFDM), a filter may be applied in the time domain to an OFDM signal (e.g., to reduce OOB). In an example, filtering may be applied per subband so that spectrum fragments may be used (e.g., to reduce implementation complexity). If some spectrum fragments in the band are unused, OOB emissions in these fragments may remain high (e.g., as may be the case for conventional OFDM). For at least this reason, UF-OFDM may be a suitable waveform to use at least at the edges of the filtered spectrum.

It should be noted that the waveforms described herein are examples and therefore not the only waveforms with which the embodiments described herein may be implemented. The example waveforms may make multiplexing possible in at least signals with non-orthogonal characteristics (e.g., such as signals with different subcarrier spacing). The example waveforms may allow co-existence of asynchronous signals (e.g., without requiring complex interference cancellation receivers). The example waveforms may facilitate the aggregation of fragmented spectrum in baseband processing, for example, as a lower cost alternative to aggregating the fragmented spectrum as part of RF processing.

In the example communication system, there may be co-existence of different waveforms within the same band (e.g., at least to support mMTC narrowband operation that may use SCMA). A combination of different waveforms, such as CP-OFDM, OFDM-OQAM and/or UF-OFDM, for some or all aspects of operation and/or for either or both of downlink and uplink transmissions, may be supported. The co-existence of waveforms may include, for example, transmissions using different types of waveforms between different WTRUs or transmissions from the same WTRU (e.g., the transmissions may be simultaneous, with some overlap, or consecutive in the time domain).

Other co-existence aspects may include, for example, support for hybrid types of waveforms (e.g., waveforms and/or transmissions that support at least a possibly varying CP duration such as one that varies from one transmission to another), support for a combination of a CP and a low power tail (e.g., a zero tail), support for a form of hybrid guard interval (e.g., using a low power CP and/or an adaptive low power tail), and/or the like. The example waveforms may support dynamic variation and/or control of one or more other aspects such as filtering. For instance, one or more of the following may be dynamically varied and/or controlled: whether to apply filtering at the edge of the spectrum used for receiving transmissions of a given carrier frequency, whether to apply filtering at the edge of a spectrum used for receiving transmissions associated with a specific SOM, whether to apply filtering per subband or per group, and/or the like. In general, a waveform/type of waveform may be considered an example of a transmission parameter that may be varied in order to achieve different types of transmission schemes. Thus, a first transmission scheme may utilize a first type of waveform (e.g., CP-OFDM) while a second transmission scheme may utilize a different waveform (e.g., OFDM-OQAM). The different waveforms may be associated with different transmission characteristics such as different potential throughputs, different latency characters, different overhead requirements, etc.

An uplink transmission scheme may use the same waveform or a different waveform as in a downlink transmission scheme. Multiplexing of transmissions to and from different WTRUs in the same cell may be based on FDMA and/or TDMA.

The design of the example communication system described herein may be characterized by a high degree of spectrum flexibility. Such spectrum flexibility may allow (e.g., enable) deployment in different frequency bands with different characteristics, including, for example, different duplex arrangements and/or different sizes of available spectrums (e.g., including contiguous and non-contiguous spectrum allocations in the same band or different bands). The spectrum flexibility may support variable timing aspects including, for example, support for multiple TTI lengths and/or support for asynchronous transmissions.

The example communication system described herein may be characterized by flexibility in duplexing arrangements. For example, the example communication system may support both TDD and FDD duplexing schemes. For FDD operations, supplemental downlink operations may be supported using spectrum aggregation. Both full-duplex FDD and half-duplex FDD operations may be supported. For TDD operations, DL/UL allocation may be dynamic. For instance, the allocation may not be based on a fixed DL/UL frame configuration; rather, the length of a DL or UL transmission interval may be set per transmission opportunity.

The example communication system described herein may be characterized by flexibility in bandwidth allocation. For example, different transmission bandwidths may be enabled on uplink and/or downlink transmissions (e.g., the transmission bandwidth may range from a nominal system bandwidth to a maximum bandwidth corresponding to a system bandwidth). In an example single carrier operation, supported system bandwidths may include, for example, at least 5, 10, 20, 40 and 80 MHz. In an example, supported system bandwidths may be any bandwidth within a given range (e.g., from a few MHz up to 160 MHz). Nominal bandwidths may have one or more values (e.g., one or more fixed values). Narrowband transmissions of up to 200 KHz may be supported (e.g., which may be within the operating bandwidth of MTC devices).

Figure 2:
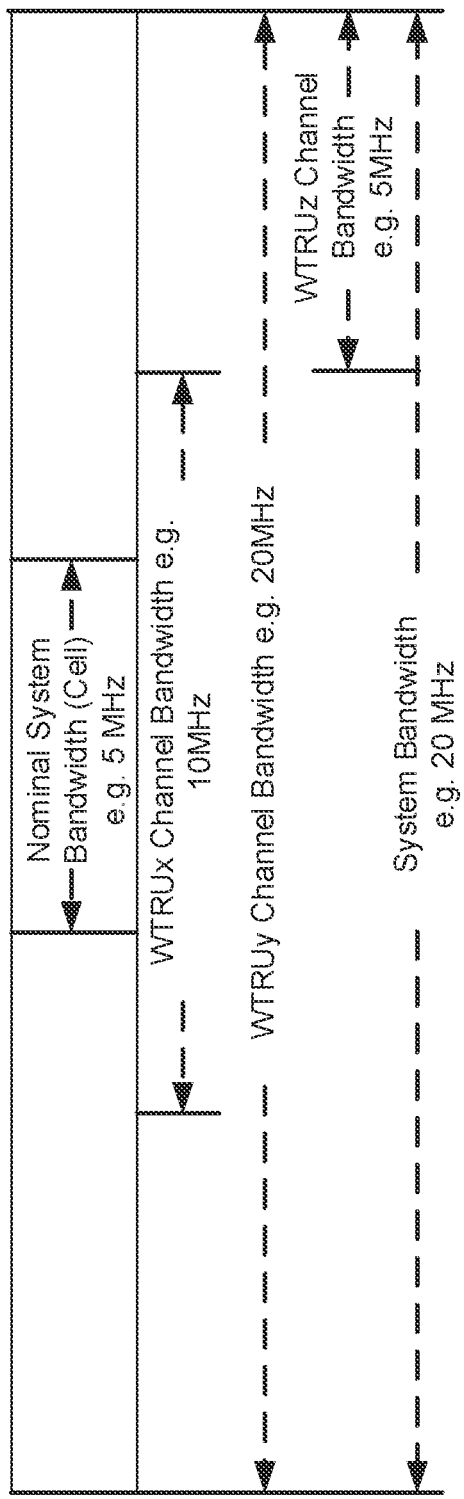
FIG. 2 is an illustration of an example of bandwidth flexibility.

FIG. 2 illustrates example transmission bandwidths that may be supported by the example communication system. The system bandwidth referred to herein may be associated with the largest portion of the spectrum that may be managed by a given carrier network. For such a carrier, the portion of the spectrum that a WTRU may support (e.g., minimally support) for cell acquisition, measurements and initial access to the network may correspond to a nominal system bandwidth. The WTRU may be configured with a channel bandwidth that is within the range of the entire system bandwidth. The WTRU's configured channel bandwidth may or may not include the nominal portion of the system bandwidth.

One example reason that bandwidth flexibility may be achieved in the example communication system described herein is that some or all of the applicable RF requirements for a given operating bandwidth (e.g., a maximum operating bandwidth) may be met without introducing additional allowed channel bandwidths for that operating band. This may be due to, for example, efficient support of baseband filtering of the relevant frequency domain waveform. The embodiments described herein may utilize techniques for configuring, reconfiguring and/or dynamically changing a WTRU's channel bandwidth for single carrier operations. The embodiments described herein may allocate spectrum for narrowband transmissions within the nominal system bandwidth, a system bandwidth or a configured channel bandwidth. A physical layer of the example communication system may be band-agnostic. The physical layer may support operations in a licensed band (e.g., below 5 GHz) as well as operations in an unlicensed band (e.g., in the range of 5-6 GHz or higher). For operations in the unlicensed band, a LBT Cat 4-based channel access framework (e.g., a channel access framework similar to LTE LAA) may be supported. The embodiments described herein may utilize techniques for scaling and/or managing cell-specific and/or WTRU-specific channel bandwidths for different spectrum block sizes. These techniques may be associated with, for example, scheduling, addressing resources, broadcasting signals, measuring, etc. Spectrum block sizes may be arbitrary.

The example communication system described herein may be characterized by flexibility in spectrum allocation. Downlink control channels and signals may support FDM operations. A WTRU may acquire a downlink carrier, e.g., by receiving transmissions via the nominal part (e.g., only the nominal part) of the system bandwidth. For instance, the WTRU may not initially be configured to receive transmissions over the entire bandwidth managed by the concerned carrier network.

Downlink data channels may be allocated over a bandwidth that may or may not correspond to the nominal system bandwidth. The allocation may be without restrictions, e.g., other than being within a WTRU's configured channel bandwidth. For example, a carrier may be operated with a 12 MHz system bandwidth using a 5 MHz nominal bandwidth. Such an arrangement may allow devices supporting 5 MHz maximum RF bandwidth to acquire and access the system, while allocating +10 to −10 MHz of the carrier frequency to other WTRUs that support up to 20 MHz worth of channel bandwidth.

Figure 3:
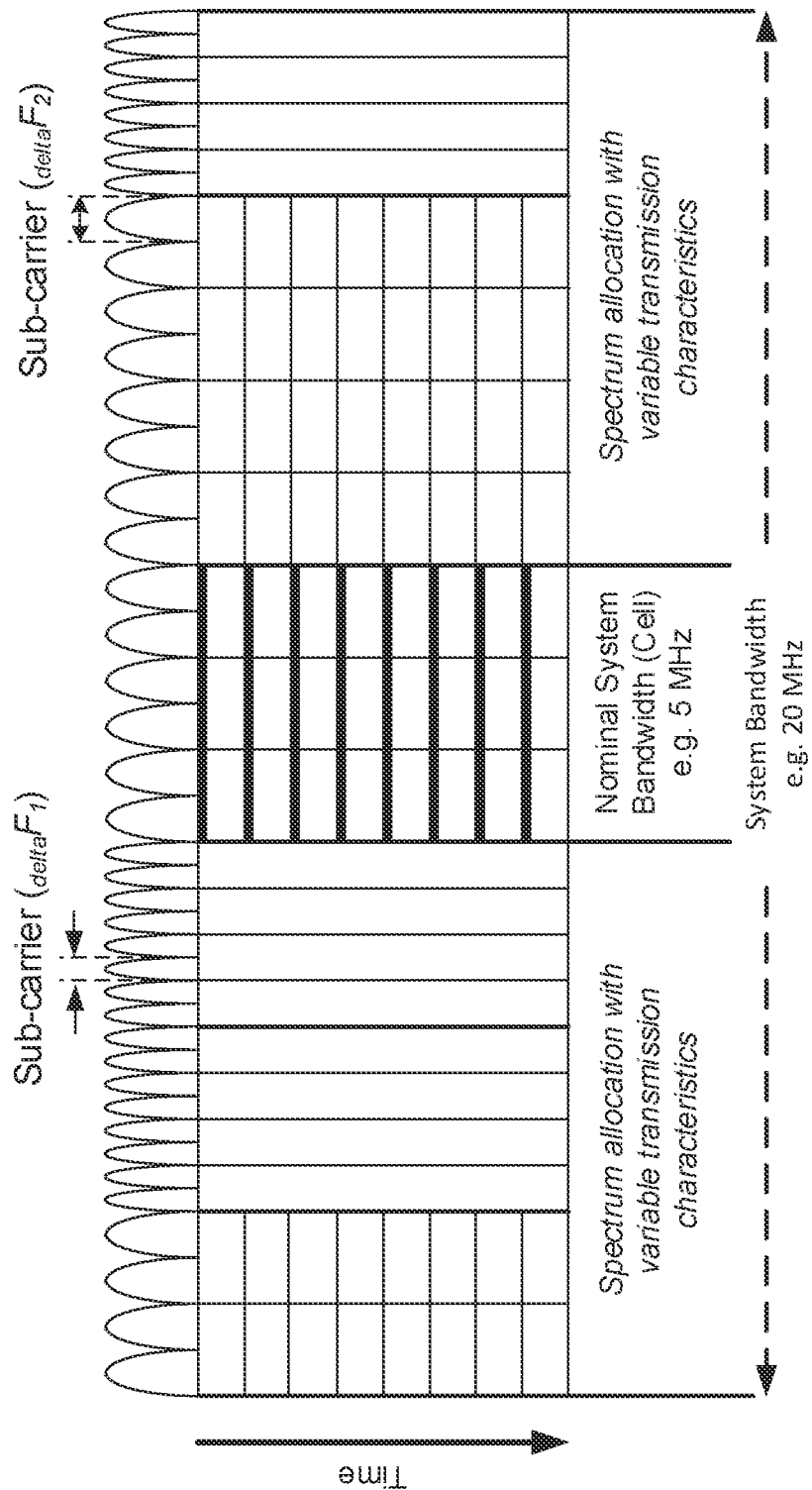
FIG. 3 is an illustration of an example of flexible spectrum allocation.

FIG. 3 shows an example of spectrum allocation where different subcarriers may be assigned (e.g., at least conceptually) to different SOMs. The different SOMs may be used to meet different requirements for different transmissions. A SOM may include/be defined based on one or more of a subcarrier spacing, a TTI length, or a reliability aspect (e.g., such as a HARQ processing aspect). A SOM may comprise a secondary control channel. For example, a SOM may include a separate control channel (e.g., separate from a primary control channel) that an associated WTRU may be configured to monitor. A SOM may be used to refer to a specific waveform or may be related to a processing aspect, e.g., to support co-existence of different waveforms in the same carrier using FDM and/or TDM, or co-existence of FDD and TDD (e.g., perform FDD operations in a TDD band, e.g., such as in a TDM manner).

A WTRU may be configured to perform transmissions according to one or more SOMs. For example, a SOM may correspond to transmissions that use one or more of the following: a specific TTI duration, a specific initial power level, a specific HARQ processing type, a specific upper bound for successful HARQ reception/transmission, a specific transmission mode, a specific physical channel (uplink or downlink), a specific waveform type, or a transmission according to a specific RAT (e.g., which may use legacy LTE or 5G transmission techniques). A SOM may correspond to a QoS level and/or related aspects such as maximum/target latency, maximum/target BLER, and/or the like. A SOM may correspond to a spectrum area and/or to a specific control channel or aspects thereof (e.g., search space, DCI type, etc.). For example, a WTRU may be configured with a SOM for one or more of a URC type of service, a LLC type of service, or a MBB type of service. A WTRU may have (e.g., the WTRU may receive) a configuration for a SOM for system access and/or for transmission/reception of L3 control signaling (e.g., RRC). For example, the WTRU may be configured to send and/or receive L3 control signaling using a portion of a system spectrum such as the nominal system bandwidth, as described herein.

Resources of a given SOM may be defined or described in terms of a specific numerology for that SOM. For example, a first SOM may use a first numerology (e.g., a first subcarrier spacing, a first symbol length, a first TTI length, a first bandwidth, a first waveform type, etc.) and a second first SOM may use a second numerology (e.g., a second subcarrier spacing, a second symbol length, a second TTI length, a second bandwidth, a second waveform type, etc.). The terms SOM and numerology may be referred to interchangeably herein.

A WTRU in the example communication system described herein may be configured to switch to a different transmission scheme if the WTRU determines that it is unable to successfully complete a transmission using an original transmission scheme. A transmission scheme, as described herein, may encompass resources, transmission techniques, transmission parameters, and/or other operational aspects associated with the performance of a transmission. For example, different transmission schemes may utilize different SOMs and/or different numerologies. As such, SOMs and/or numerologies may be an example of an operational aspect that may be varied for different types of transmission schemes.

The example communication system described herein may support spectrum aggregation (e.g., for at least single carrier operations). For example, spectrum aggregation may be supported in situations where a WTRU is capable of transmitting and/or receiving multiple transport blocks over contiguous and/or non-contiguous sets of physical resource blocks (PRBs) within a same operating band. A transport block may be mapped to separate sets of PRBs. Transmissions associated with different SOMs may be performed simultaneously.

The example communication system described herein may support multicarrier operations. Such support may be provided, for example, by utilizing contiguous and/or non-contiguous spectrum blocks within a same operating band or across two or more operating bands. The example communication system may support aggregation of spectrum blocks. For example, spectrum blocks may be aggregated using different modes such as FDD and/or TDD, and/or different channel access techniques such as licensed and unlicensed band operation below 6 GHz. A WTRU's multicarrier aggregation operation may be configured, reconfigured, and/or dynamically changed by the network and/or the WTRU.

Downlink and/or uplink transmissions may be organized into radio frames. The radio frames may be characterized by a number of fixed aspects (e.g., location of downlink control information) and/or a number of varying aspects (e.g., transmission timing and/or supported types of transmissions). A basic time interval (BTI) may be expressed in terms of a number (e.g., an integer number) of one or more symbol(s). A symbol duration may be a function of the subcarrier spacing applicable to a time-frequency resource. For at least FDD, subcarrier spacing may differ between an uplink carrier frequency $f_{UL}$ and a downlink carrier frequency $f_{DL}$ for a given frame. A transmission time interval (TTI) may be the minimum time supported by the system between consecutive transmissions. One or more (e.g., each) of the consecutive transmissions may be associated with different transport blocks ($TB_S$) for the downlink ($TTI_{DL}$) and/or the uplink (UL TRx). A preamble of the downlink and/or uplink (if applicable) may be excluded from TTI determination. Control information (e.g., DCI for downlink or UCI for uplink) may be included in TTI determination. A TTI may be expressed in terms of a number of (e.g., an integer number of) one of more BTI(s). A BTI may be specific and/or may be associated with a given SOM and/or numerology.

The example communication system described herein may support various frame durations, including, for example, 100 us, 125 us (⅛ ms), 142.85 us (e.g., 1/7 ms or 2 nCP LTE OFDM symbols), and/or 1 ms. Frame durations may be set to enable alignment with a legacy LTE timing structure. A frame may start with downlink control information (DCI) of a fixed time duration $t_{dci}$ that precedes downlink data transmission (DL TRx) for the concerned carrier frequency (e.g., $f_{UL+DL}$ for TDD and $f_{DL}$ for FDD). For TDD duplexing (e.g., only for TDD duplexing), a frame may comprise a downlink portion (e.g., DCI and/or DL TRx) and/or an uplink portion (e.g., UL TRx). A switching gap ("swg") may precede (e.g., always precede) the uplink portion of the frame, if present. For FDD duplexing (e.g., only for FDD duplexing), a frame may comprise a downlink reference TTI and one or more TTI(s) for the uplink. The start of an uplink TTI may be derived using an offset (toffset) applied from the start of the downlink reference frame, which may overlap with the start of the uplink frame. Duplexing modes (e.g., TDD versus FDD) may be an example of an operational aspect that may be varied for different types of transmission schemes.

The example communication system described herein may support D2D/V2x/Sidelink operation in a frame. The example communication system may utilize various configurations/techniques to provide the D2D/V2x/Sidelink support. In an example (e.g., when TDD is used), the example communication system may include respective downlink control and forward direction transmissions in the DCI+DL TRx portion of a frame (e.g., when a semi-static allocation of resources is used), or in the DL TRx portion of a frame (e.g., when a dynamic allocation of resources is used). Additionally or alternatively, the example communication system may include respective reverse direction transmissions in the UL TRx portion of a frame. In an example (e.g., when FDD is used), the example communication system may support D2D/V2x/Sidelink operations in the UL TRx portion of a frame, for example, by including respective downlink control, forward direction and reverse direction transmissions in the UL TRx portion of the frame. Further, resources associated with the respective transmissions may be dynamically allocated.

Figure 4A:
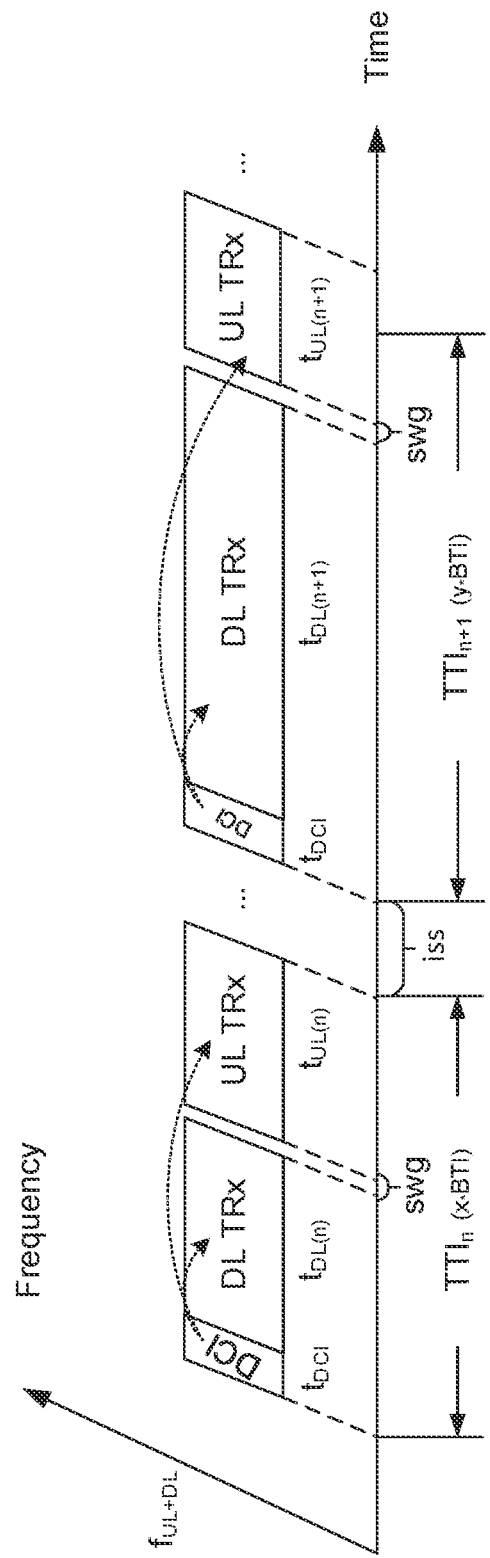
FIG. 4A is an illustration of an example of timing relationships for TDD duplexing.
Figure 4B:
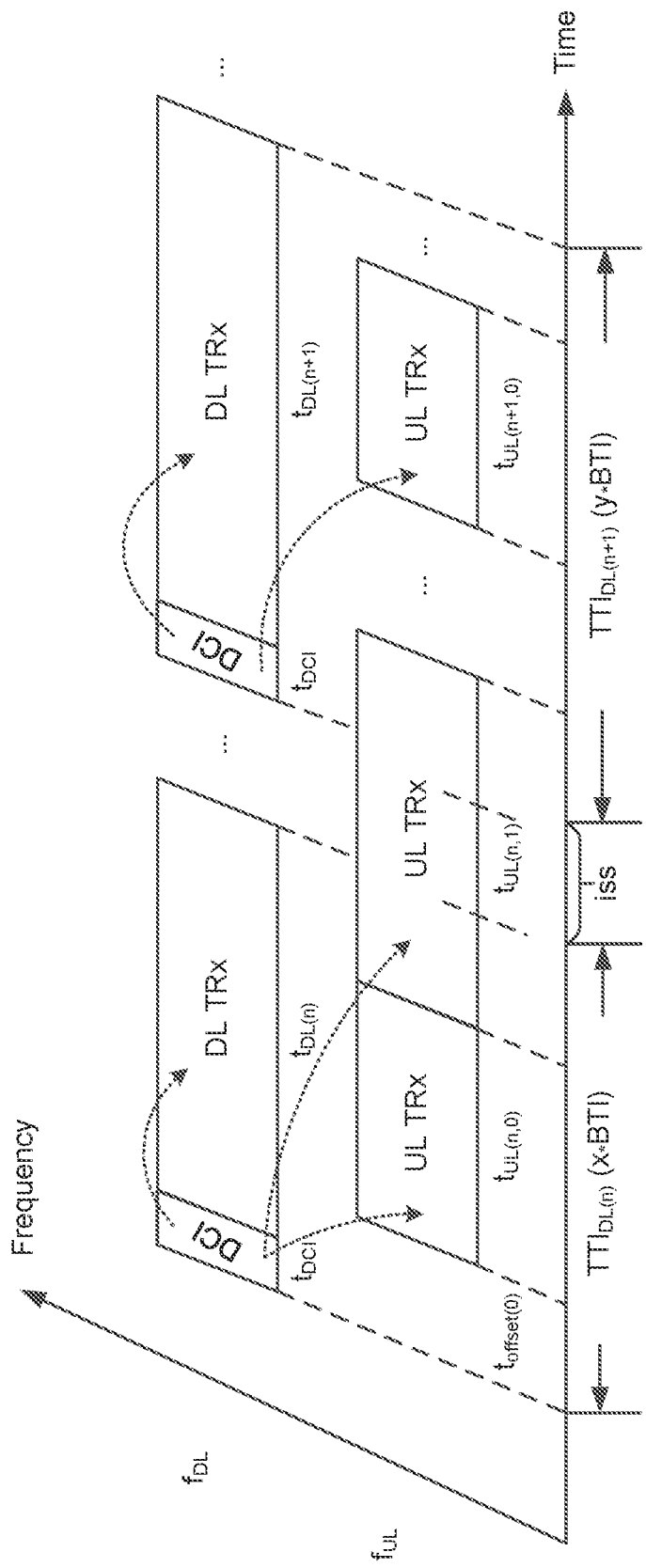
FIG. 4B is an illustration of an example of timing relationships for FDD duplexing.

FIG. 4A shows an example TDD frame structure. FIG. 4B shows an example FDD frame structure.

The example communication system described herein may employ various scheduling and/or rate control techniques, including, for example, a scheduling function in the MAC layer, a network-based scheduling mode, and/or a WTRU-based scheduling mode. A network-based scheduling mode may result in tight scheduling in terms of resources, timing and/or transmission parameters of downlink transmissions and/or uplink transmissions, for example. A WTRU-based scheduling mode may result in flexibility in terms of timing and/or transmission parameters, for example. For one or more of the scheduling techniques (e.g., scheduling modes), scheduling information may be valid for a single TTI or for multiple TTIs. Scheduling techniques (e.g., scheduling modes) may be an example of an operational aspect that may be varied for different types of transmission schemes.

Network-based scheduling may enable a network to tightly manage radio resources assigned to different WTRUs (e.g., so as to optimize the sharing of such resources). In at least some cases, the network may conduct the scheduling dynamically. WTRU-based scheduling may enable a WTRU to access (e.g., opportunistically access) uplink resources with minimal latency on a per-need basis and/or within a set of shared or dedicated uplink resources assigned by the network. The shared or dedicated uplink resources may be assigned dynamically or statically. A WTRU may be configured to perform synchronized and/or unsynchronized opportunistic transmissions. A WTRU may be configured to perform contention-based and/or contention-free transmissions. For example, a WTRU may be configured to perform opportunistic transmissions (e.g., scheduled or unscheduled) to meet ultra-low latency requirements (e.g., for 5G) and/or power saving requirements (e.g., in mMTC use cases).

The example communication system described herein may prioritize logical channels. For example, the example communication system may be configured to associate data and resources (e.g., for uplink transmissions). The example communication system may multiplex data that have different QoS requirements within a same transport block if, for example, such multiplexing does not negatively impact the QoS requirements of a service or unnecessarily waste system resources. Logical channel prioritization may be an example of an operational aspect that may be varied for different types of transmission schemes.

The example communication system described herein may encode a transmission using different encoding techniques. Different encoding techniques may have different characteristics. An encoding technique may generate a sequence of one or more information units or blocks. An information unit or block (e.g., each information unit or block) may be self-contained. For example, an error in the transmission of a first block may not impair the ability of the receiver to successfully decode a second block if, for example, the second block is error-free, and/or if sufficient redundancy can be found in the second block or in a different block for which at least a portion was successfully decoded.

Example encoding techniques may include raptor/fountain codes whereby a transmission may comprise a sequence of N raptor codes. One or more such codes may be mapped to one or more transmission symbols in time. A transmission symbol may correspond to one or more sets of information bits (e.g., one or more octets). Using such an encoding technique, FEC may be added to a transmission whereby the transmission may use N+1 or N+2 raptor codes or symbols, assuming a one raptor code per symbol relationship exists. This way, transmissions may be resilient to symbol loss, for example, due to interference and/or puncturing by another transmission that is overlapping in time. Encoding/decoding techniques may be an example of an operational aspect that may be varied for different types of transmission schemes.

A WTRU may be configured to receive and/or detect one or more system signatures. A system signature may comprise a signal structure using a sequence. The signal may be similar to a synchronization signal. The system signature may be specific to a particular node or TRP within a given area (e.g., may uniquely identify the node or TRP), or it may be common to a plurality of such nodes or TRPs within an area. One or more of the foregoing aspects may not be known and/or may be irrelevant to the WTRU. The WTRU may determine and/or detect a system signature sequence, and may further determine one or more parameters associated with the system. For example, the WTRU may derive an index and use the index to retrieve associated parameters (e.g., the WTRU may retrieve the parameters from a table such as an access table described herein). The WTRU may use the received power associated with a system signature for open-loop power control (e.g., to set an initial transmission power if the WTRU determines that it may access and/or transmit using applicable resources of the system). For example, the WTRU may use the timing of the received signature sequence to set the timing of a transmission (e.g., a preamble on a PRACH resource) if the WTRU determines that it may access and/or transmit using applicable resources of the system. Different signal structures may be associated with different SOMs and/or different numerologies. As such, signal structures may be an example of an operational aspect that may be varied for different types of transmission schemes.

A WTRU may be configured with a list of entries (e.g., operating parameters) that may be referred to as an access table. Although referred to as an access table, it should be noted that the list of entries may be stored in any suitable type of structures including a table structure. The list of entries or access table may be indexed such that an entry (e.g., each entry) may be associated with a system signature and/or to a sequence thereof. The list or access table may provide initial access parameters for one or more areas. For example, an entry (e.g., each entry) in the list may provide one or more parameters associated with performing an initial access to the system. Such parameters may include, for example, one or more random access parameters such as applicable physical layer resources (e.g., PRACH resources) in time and/or frequency, an initial power level, and/or physical layer resources for response reception. Such parameters may include access restrictions such as PLMN identity and/or CSG information. Such parameters may include routing-related information such as an applicable routing area. An entry (e.g., each entry) may be associated with and/or indexed by a system signature. An entry (e.g., each entry) may be common to a plurality of nodes or TRPs. The WTRU may receive such a list or access table via a transmission over dedicated resources (e.g., RRC configuration) and/or a transmission using broadcasted resources. In at least the latter case, the periodicity of the transmission of the access table may be long (e.g., up to 10240 ms). For example, the periodicity of the transmission of the access table may be longer than the periodicity of the transmission of a signature (e.g., which may be in the range of 100 ms). The access table described above may be an example of an operational aspect that may be varied for different types of transmission schemes.

The example communication system described herein may support a variety of use cases. Each use case may include a different set of QoS requirements. There may be differentiation among these use cases in terms of applicable radio resources and/or transmission techniques. For example, the use cases may be different in terms of TTI duration, reliability, diversity applied to the transmission, maximum latency, etc. QoS differentiation may be introduced for different data packets, data flows and/or data bearers (or their equivalents). The differentiation may be in terms of maximum guaranteed delay budget, packet error rate, data rate, and/or the like. The MAC layer may handle one or more of the functionalities described herein in order to address all or a subset of the following aspects.

Given different possible radio resources and/or transmission techniques with different characteristics, a WTRU may be configured to request, determine and/or access resources (e.g., suitable uplink transmission resources) that support the QoS requirements of a data service. Given different possible resource allocations (e.g., in the uplink and/or downlink) with different characteristics, a WTRU may be configured to exercise control (e.g., to control grant and/or resource allocation) over downlink and uplink transmissions (e.g., determine and handle one or more types of allocation differently). Given different characteristics associated with different transport blocks, a WTRU may be configured to multiplex and/or assemble MAC PDUs that meet the applicable QoS requirements. For example, the WTRU may assign data associated with different bearers, different logical connections and/or the like according to an extended set of rules (e.g., by taking into consideration the QoS properties of the concerned data and/or of the SOM associated with the concerned TB). Given the use cases and transmission techniques described herein, a WTRU may be configured to satisfy one or more pre-requisites for uplink transmissions (e.g., the pre-requisites may include UL TA, positioning, WTRU speed, PL estimate, etc.). For example, the WTRU may manage and/or determine whether it has sufficient pre-requisites for performing a given type of transmission.

The example communication system may perform scheduling and/or scheduling-related operations based on QoS requirements. A network scheduler by itself may not always be able to enforce all types of QoS requirements for all types of data. For example, a network-based scheduling function may not have timely information and/or exact knowledge of the QoS requirements associated with data available for uplink transmission in a WTRU's buffer. A WTRU may be configured to enable services that have strict reliability and/or latency requirements (e.g., these behaviors may enable a WTRU to receive URLLC services). A WTRU may impact how/what data is transmitted (e.g., via additional parameters). For example, a WTRU may be configured with one or more parameters that are associated with a characterization of how data is transmitted. The characterization may represent constraints and/or requirements that the WTRU is expected to meet and/or enforce when transmitting data. Based on the characterization, the WTRU may perform different operations and/or adjust its behaviors, for example based on a state and/or characteristic of the data (e.g., as a function of the state and/or characteristic of the data).

The example communication system described herein may include one or more of the following time-related QoS requirements (e.g., time-related characteristics). These time-related QoS requirements may be helpful, for example, when a network scheduler is unable to enforce timing/latency requirements by itself (e.g., for at least a subset of the data available for transmission). A WTRU may be configured to transmit data that are associated with one or more specific time-related QoS requirements. Depending on these time-related QoS requirements, a WTRU may change one or more operational aspects of a given transmission scheme used for transmitting the data. For example, if the WTRU is near the end of a transmission using a first transmission scheme without successfully transmitting the data (e.g., without meeting one or more time-based QoS requirements), the WTRU may vary one or more operational aspects of the first transmission scheme to switch to a second transmission scheme in order to try and successfully transmit the data prior to expiry of the time-based QoS requirements.

The time-based QoS requirements described herein may include a maximum time allowed for fulfilling one or more aspects of a data transmission (e.g., an uplink data transmission). A WTRU may determine whether such a maximum time is reached or exceeded based on observation and/or estimation. The time-based QoS requirements may include a maximum amount of time allowed for obtaining a suitable resource for the data transmission. The WTRU may determine the time associated with the acquisition of a suitable resource by monitoring a control channel. For example, the WTRU may determine such time as a function of a grant received via the control channel, as a function of a parameter signaled in the control channel, and/or the like. The WTRU may determine a time associated with the acquisition of a suitable resource by monitoring a SOM associated with the resource acquisition. The WTRU may determine a time associated with the acquisition of a suitable resource by monitoring one or more states of the WTRU. Such states may include, for example, whether the WTRU is synchronized or unsynchronized, whether a scheduling request is ongoing, etc.

The time-based QoS requirements may include a maximum time that data is allowed to stay in a WTRU's transmission buffer. The WTRU may be configured to determine such a maximum time based on the timing of an initial transmission of the data. For example, the WTRU may be configured to determine how long the data have been staying in the WTRU's transmission buffer by maintaining a timer that tracks the time elapsed since the data entered the transmission buffer until the beginning of an initial transmission of the data.

The time-based QoS requirements may include a maximum amount of time for a data transmission to reach a HARQ operational point. Using the $x^{th}$ transmission of a PDU containing the relevant data as an example, the time for a WTRU to reach a HARQ operational point may be determined as the time it takes the WTRU to perform $x^{th}-1$ retransmissions of the PDU.

The time-based QoS requirements may include a maximum amount of time allowed for successfully completing a data transmission or receiving feedback on the transmission of a PDU containing the data. A WTRU may determine such time based on when the WTRU receives HARQ feedback such as an HARQ ACK for a corresponding transport block.

The time-based QoS requirements may include a maximum value for a Time-To-Live (TTL) parameter associated with the data. Such a TTL parameter may be associated with, for example, a transmission of a data packet or any other action taken by a WTRU with respect to the data packet. For example, a WTRU may maintain (e.g., be configured with) a TTL parameter having a certain threshold value (e.g., N milliseconds) in association with the transmission of a data packet. The WTRU may monitor a time lapse since the data packet became available for transmission (e.g., after the WTRU received the data packet in its buffer). If the threshold is reached without the data packet being successfully transmitted, the WTRU may determine that the TTL has expired. The WTRU may perform different actions based on the amount of TTL remaining. For example, a WTRU may switch to a different transmission scheme upon determining that the TTL has reached a threshold value.

The time-based QoS requirements may include a maximum amount of time allowed for completing a logical grouping of data, for example based on a radio bearer. The time-based QoS requirements may include a maximum amount of time allowed for worst case or head-of-queue delays. A WTRU may be configured to determine such delays based on data that spend the longest time in the WTRU's buffer, for example.

The time-based QoS requirements may include an average or punctual time associated with one or more aspects of a data transmission. A WTRU may determine such an average or punctual time based on observation and/or estimation. For example, the time-based QoS requirements may include an average amount of time that data are allowed to stay in a WTRU's transmission buffer (e.g., in association with the same logical channel, group and/or SOM). A WTRU may be configured to determine such an average time based on, for example, the time period between when the data became available for transmission and when the data are transmitted. The WTRU may determine the time at which such data became available for transmission based on the timing for initiating a procedure to request and/or acquire transmission resources, and/or the timing for transmitting a signal to that effect. The WTRU may determine the time at which such data is transmitted based on, for example, the timing for an initial transmission of the data, or the timing for receiving an ACK for a transmission of the data. The average described herein may be a moving average (e.g., within a window of a specific length), an average per burst associated with the data, an average since the WTRU last requested resources for such data, or an average since the WTRU first acquired resources for the transmission of such data.

The time-based QoS requirements may include a permissible variation from an average time. The variation may correspond to, for example, a reduction or an increase to the average. Using the aforementioned buffer time as an example, the timing requirements may provide that the amount of time data are allowed to stay in the WTRU's transmission may exceed an average time only by a specific amount.

The time-based QoS requirements may include an average or punctual time allowed for reducing data in the WTRU's buffer. For example, such an average or punctual time may be associated with reducing the amount of data in a WTRU's buffer to a certain level (e.g., the level may be configurable). The level may correspond to other time-related characteristics described herein, such as a maximum time allowed to successfully complete a transmission. A WTRU may determine such an average time based on estimation or observation.

The time-based QoS requirements may include an average or punctual time for worst case or head-of-queue delays. A WTRU may be configured to determine such an average or punctual time based on multiple occurrences of worse case delays.

The time-based QoS requirements may include an average or punctual time allowed for performing logical grouping of data (e.g., based on a radio bearer and/or the like).

The time-based QoS requirements may be related to a HARQ entity, a HARQ process type, and/or an ongoing HARQ process.

A WTRU may determine that the transmission of an uplink data unit (e.g., an uplink data packet) has a QoS requirement. The QoS requirement may be a time-related QoS requirement associated with one or more aspects of the uplink transmission, as described herein. The WTRU may attempt to transmit the uplink data unit using a first transmission scheme. The WTRU may determine whether the QoS requirement can be met using the first transmission scheme, for example for at least a subset of the data available for transmission. For example, based on the QoS requirement, the WTRU may determine that a TTL parameter that the WTRU maintains for the uplink data unit should not exceed a certain threshold. The TTL parameter may, for example, reflect an amount of time elapsed since the uplink data unit became available for transmission until the uplink data unit is successfully transmitted. The WTRU may monitor the TTL parameter, and upon determining that the TTL has reached the threshold before the uplink data unit can be successfully transmitted using the first transmission scheme, the WTRU may choose a second transmission scheme to transmit the uplink data unit. The second transmission scheme may differ from the first transmission scheme in at least one operational aspect, as described in greater detail herein.

The example communication system described herein may include one or more of the following transmission rate-related requirements (e.g., transmission-rate related characteristics). As described herein, a network scheduler may not always be able to enforce transmission rate-related requirements by itself (e.g., for at least a subset of the data available for transmission in a WTRU). A WTRU may be configured such that the grouping of data may be associated with a transmission rate-related requirement. Such grouping may include a logical association between data packets and/or PDUs such as a LCH, a LCG, an association of data with SOMs and/or one or more aspect thereof, an association of data with a radio bearer, and/or the like. For example, the WTRU may be configured with a transmission rate (e.g., such as a prioritized bit rate) for such data. The WTRU may use the transmission rate to determine how much data should be included in a transmission (e.g., by conducting a logical channel prioritization operation). The transmission rate-related requirements may be related to a HARQ entity, to a HARQ process type, and/or to an ongoing HARQ process. The WTRU may observe and/or estimate the rate of transmission for at least a subset of the data (e.g., using similar metrics described herein for the timing-related aspects). The WTRU may determine whether or not the concerned transmission rate-related requirements may be met, and take different actions based on determination (e.g., to switch to a different transmission scheme).

To illustrate, a WTRU may attempt to transmit an uplink data unit using a first transmission scheme. The WTRU may determine whether or not a transmission rate-related requirement, or more generally a QoS requirement associated with the uplink transmission, can be met (e.g., for at least a subset of the data) using the first transmission scheme. If the WTRU determines that the transmission rate-related requirement may not be met using the first transmission scheme, the WTRU may determine to switch to a second transmission scheme in order to satisfy the concerned transmission rate-related requirement. The second transmission scheme may differ from the first transmission scheme in at least one operational aspect, as described in greater detail herein The example communication system described herein may include one or more of the following configuration-related requirements (e.g., configuration-related characteristics). For example, a WTRU may be configured to give certain data a transmission priority (e.g., an absolute priority) that supersedes one or more other QoS requirements. In an example, a WTRU may be configured by an upper layer to transmit a packet with the highest priority, e.g., regardless of other timing, rate or efficiency-related QoS requirements.

The example communication system described herein may allow and/or enable other WTRU behaviors including, for example, random access for TRP, changing and/or monitoring of a control channel, grant and/or transmission parameter selection, SR method selection, and/or the like.

As described herein, a WTRU may be configured to determine that one or more QoS requirements related to a transmission (e.g., an uplink transmission) may not be met. Such QoS requirements may be timing and/or rate related (e.g., such as those described herein), for example. The inability to meet the QoS requirements may, for example, lead to a change of an applicable procedure, a change of a transmission scheme, and/or a change to other transmission-related behaviors. For example, the WTRU may attempt an uplink transmission using a first transmission scheme. The WTRU may determine whether or not a QoS requirement such as a timing-related or a transmission rate-related requirement described herein can be met using the first transmission scheme (e.g., for at least a subset of the data available for transmission). If the WTRU determines that the QoS requirement may not be met using the first transmission scheme, the WTRU may adjust its operations in order to meet the QoS requirement. For example, the WTRU may autonomously adjust the transmission scheme used for the transmission. The adjustments, which may include an increase to, a change to, or a reduction of the resources used for transmission, may result in changes in one or more operational aspects of the transmission scheme (e.g., one or more transmission parameter changes).

When changing transmission schemes, the WTRU's connectivity to the network may be affected/changed. Thus, connectivity type may be an example of an operational aspect that may vary between different transmission schemes. For example, upon changing the connectively type, the WTRU may initiate an access procedure and/or request a reconfiguration procedure with the network (e.g., an L3 reconfiguration). In an example, the WTRU may initiate an RRC procedure that requests a reconfiguration of its connectivity. The request may include one or more of the following. The request may include an identity of an applicable logical data grouping (e.g., LCH, LCG, SOM, and/or the like). The request may include information related to the QoS-aspect that triggered the request for change in connectivity (e.g., the amount of resource adjustment, rate or timing for an improvement, etc.). The request may include information related to the data to be transmitted (e.g., head-of-queue delay or average delay, the amount of outstanding data, etc.). The WTRU may include a measurement in the request.

The WTRU may initiate a TRP access and/or a random access. For example, the WTRU may initiate an access to the system for purposes of increasing the amount of resources available, changing the type of resources, modifying the amount of associated TRPs, and/or the like. The WTRU may determine (e.g., from measurements of a reference signal such as a signature) that one or more TRPs may be in the WTRU's range. The WTRU may determine suitable random access resources (e.g., using information included in in an access table). The WTRU may initiate the transmission of a preamble on such resources. The foregoing operations may lead to a different set of resources available to the WTRU (e.g., the resources may increase or decrease, and/or there may be a different set of control channels to monitor). For example, the WTRU may initiate an increase of the set of available resources, which may lead to an aggregation of more physical layer resources, more carriers, additional TRPs and/or Uu interfaces with network entities (e.g., the network entities may include eNBs and/or TRPs, the interface may be via dual connectivity or a similar technology, etc.).

When changing transmission schemes, the WTRU may expand or modify the identity and/or number of control channel that the WTRU is monitoring. Thus, the set of one or more control channels monitored by the WTRU may be an example of an operational aspect that may be varied for different transmission modes. For example, the WTRU may determine that different and/or additional control channels are available for scheduling transmissions. The WTRU may request and/or activate these control channels. The WTRU may perform the determination following the transmission of a signal (e.g., to a network). The signal may indicate a request to activate such control channels. In an example, the WTRU may perform the determination in a manner similar to performing an access to the system (but for the same signature and/or cell). The WTRU may switch and/or add control channels. For example, the WTRU may switch to and/or add a control channel that is associated with a different SOM (e.g., the control channel may be associated with different physical layer resources, different physical data channels, and/or a different numerology).

When changing transmission schemes, the WTRU may expand and/or modify available resources. Thus, the set of available resources may be an example of an operational aspect that may be varied for different transmission modes. The WTRU may determine that a different set of resources is available. The WTRU may switch to a different set of DCIs and/or DCI types. For example, the WTRU may determine that it may attempt to decode a different set of DCIs on a control channel. Such DCIs may be associated with a different SOM, a different numerology, a different set of PRBs, and/or the like. The WTRU may update its control channel monitoring activities (e.g., DRX may be updated). For example, the WTRU may change its monitoring frequency or intensity for a control channel (e.g., to start decoding more intensely). The WTRU may enter an active mode for a control channel when more resources are desired. The WTRU may select a scheme for scheduling requests based on QoS requirements (e.g., as a function of the QoS requirements). For example, the WTRU may select a specific scheme for obtaining transmission resources based on the QoS requirements associated with the data to be transmitted (e.g., as a function of the QoS requirements). The WTRU may use a contention-based transmission scheme if the WTRU determines that applicable QoS requirements for the data can be met. The WTRU may use a dedicated SR resource for transmission if the WTRU determines that an applicable QoS requirement for the data may not be met. If the WTRU determines that a plurality of resources and/or request scheduling schemes are available, the WTRU may select a request scheduling scheme and/or resources associated with a SOM if the scheme and/or resources may enable a transmission that meets the applicable transmission requirements.

When changing transmission schemes, the WTRU may modify and/or select a specific transmission parameter or a grant. Thus, transmission parameters and/or grants may be an example of an operational aspect that may be varied for different transmission modes. For example, the WTRU may determine that a different set of transmission parameters are available and/or may be used for data transmission. The WTRU may select a grant among a plurality of grants such that one or more characteristics of the data transmission may be modified. Such characteristics may include reliability, HARQ operating point, diversity applied to the transmission, transmission power, etc.

When changing transmission schemes, the WTRU may modify multiplexing, assembly, and/or segmentation techniques and/or rules associated with the data transmission. Thus, multiplexing, assembly, and segmentation may be examples of an operational aspect that may be varied for different transmission modes. For example, a WTRU may change its multiplexing rules, assembly and/or segmentation rules, and/or the like, when creating MAC PDUs for transmission of data. For example, the WTRU may skip segmenting packets at the MAC layer when dealing with data for which a QoS requirement may not be met.

A WTRU may be configured to maintain and/or react on latency-related characteristics or criteria (e.g., a time-related QoS requirement) for a first subset of data, but not for a second subset of data. The first subset of data may be associated with a first logical channel, a first flow, a first service, a first data type, and/or the like. The second subset of data may be associated with a second logical channel, a second flow, a second service, a second data type, and/or the like. In an example, rate-related criteria may be associated with a specific set of one or more logical channels, but not for other logical channels. In an example, QoS requirements may be provided with packets from upper layers on any logical channel or flow. The QoS requirements may be provided on an as-needed basis.

When changing transmission schemes, the WTRU may provide the network with information associated with the uplink data that the WTRU is attempting to transmit. For example, a WTRU may transmit QoS-related information. The WTRU may transmit the QoS-related information along with relevant data packets, SDUs, and/or collection of bytes (e.g., in a MAC PDU). For instance, the WTRU may transmit a TTL with its associated packets, SDUs, and/or collection of bytes. The TTL (or an absolute time) may be represented in time units (e.g., milliseconds). The TTL may occupy the least significant portion of an absolute time (e.g., to allow the recipient to determine what the absolute time may be).

QoS-related information may be appended to relevant data. A receiving entity of the data with which the QoS-related information is sent may be a network node (e.g., a base station), or a receiving WTRU. The receiving entity may be involved, for example, in data operations such as relaying and/or forwarding, e.g., such as an eNB configured to enable V2V communications (e.g., by forwarding UL transmissions directly to a destination). The receiving entity may use the QoS-related information to determine how to process the received data. The receiving entity (e.g., a base station) may determine and/or modify a best or preferred path, a resource, a TTI, a SOM, and/or the like associated with transmitting the data to a final destination. The receiving entity may modify and/or prioritize its processing of the received data according to QoS requirements. For example, the receiving entity may modify and/or prioritize the enforcement of resource reception priority (e.g., in the case of RF or base-band limitations). The receiving entity may modify resources, RATs, and/or mechanisms (e.g., SC-PTM versus unicast versus eMBMS) that are used to relay the received data. The receiving entity may select a path for relevant cell(s) or network(s) to forward the data. For example, the receiving entity may determine whether to send the data to an application server in the network or send the data to a proxy application service located in a cell or TRP.

Time-related requirements (e.g., such as those related to latency) may have various representations in a WTRU. The WTRU may use the time-based requirements as criteria for determining when the WTRU should switch from a first transmission scheme to a second transmission scheme. For example, the WTRU may maintain latency requirements. The WTRU may obtain, e.g., from an upper layer, transmission latency requirements. The WTRU may use such requirements to, for example, make scheduling decisions and/or resource usage decisions, to guide aspects related to the request of resources, to perform multiplexing/de-multiplexing, and/or to control transmissions. For instance, the WTRU may maintain and/or monitor a TTL parameter that may be representative of the time elapsed from the reception of a data packet until a successful transmission of the data packet. The WTRU may utilize the TTL parameter at a transmission stage (e.g., at each transmission stage) to adjust a behavior, a procedure, and/or the like in a way to meet a time-related QoS requirement. The WTRU may maintain the TTL for a packet, a SDU, a collection of bytes, and/or the like. The TTL may be associated with an amount of time allocated to successfully complete a transmission over the air interface.

The WTRU may perform a specific operation (e.g., within its transmission stack) to change the WTRU's behavior when the TTL reaches a certain value or exceeds a certain range. For example, the WTRU MAC may decide to initiate an autonomous transmission using one or more of the techniques described herein (e.g., use contention-based resources) when the TTL associated with a MAC PDU has reached a certain threshold.

The MAC may decide to utilize one HARQ type over another, one TTI over another, one transport channel over another, and/or one coding rate over another when, for example, the TTL associated with a MAC PDU has reached a certain threshold. Thus, a TTI length, a transport channel identity, a coding rate, etc. may be examples of an operational aspect that may be varied when the WTRU changes transmission schemes. The WTRU may decide to trigger a specific request for resources (e.g., on a certain SOM) from the network, or to use a different mechanism to issue such a request, when the TTL has reached a certain threshold.

It should be noted that the notion of TTL as used here is not limited to any one particular definition. For example, the notion of TTL may encompass any mechanism for defining and representing one or more QoS requirements. Thus, some examples may be described with respect to using a TTL to determine when to switch transmission schemes and/or change a transmission parameter, but other information indicative of one or more QoS requirements may also be used as a criteria for determining when to switch transmission schemes and/or change a transmission parameter.

The example communication system described herein may be characterized by features related at least to requests, determination, and access of suitable transmission resources. For example, these features may be related to the scheduling and/or determination of one or more applicable control channels (e.g., SOM-specific control channel).

The example communication system described herein may be characterized by a unique mechanism for requesting network access (e.g., access to suitable resources) in order to meet a specific QoS requirement (e.g., a time-related QoS requirement). In one example embodiment, a WTRU may send a resource request (RR) to the network. The RR may include a request for new or modified resources and/or may indicate a buffer status. The RR may include a request for a change of connectivity to the network. The RR may include request for a change of resources. The RR may include a request for a change of the control channels to be monitored or configured. The RR may include a request for a change of TRPs. The RR may include a request for a change of SOMs. The RR may include a request for a change of another aspect as described herein.

An RR may indicate QoS related parameters and/or may provide an indication or potential indication of a failure to meet QoS requirements. In order to meet QoS related requirements, different resource request mechanisms and/or formats may be defined and used for different services, logical channels, logical channel groups, and/or QoS groups. The type of an RR may be determined based on one or more QoS parameters reaching a certain threshold. An RR may be sent based on the one or more QoS parameters reaching a certain threshold (e.g., TTL reaching a threshold).

An RR may be characterized by the type of transport format used, the type of resources in which the RR is transmitted, information provided within the RR, TTI length used for RR transmission, SOMs, and/or the like. A WTRU may determine which RR to use based on one or more QoS characteristics.

Information transmitted in an RR may include, for example, a request for resources, a request for modification of assigned resources, an indication of buffer status, and/or an indication of a failure or a potential failure to meet certain QoS requirements. An RR may include an indication of an intention to transmit in an upcoming resource and/or the resource the RR plans on using. An RR may include an indication that resources are being requested in order to meet certain QoS requirements associated with the data for which the RR was triggered. In some examples, such an indication may be the only information provided in an RR. In other examples, additional information such as information about a transmission and/or a transmitting WTRU may be provided in an RR.

The WTRU may, in an RR, identify one or more of the specific services, SOMs, and/or LCGs to which the RR applies. In an example, the indication comprised in the RR may signal a request to allocate additional resources for the SOM/transport channel in which the RR is being transmitted (e.g., assuming distinct physical resources are used for different SOMs/transport channels). The WTRU may transmit multiple RRs (e.g., one for resources associated with each SOM) in a single SOM. An RR (e.g., each of the multiple RRs) may signal a request for resources associated with a different SOM. The association between an RR and the SOM for which the RR is being sent may be based on a tag (e.g., the tag may be included in the RR), based on the resources used (e.g., location of bits in time or frequency or both), based on other physical characteristics of the RR transmission (e.g., transmit power/energy, modulation schemes, etc.), based on the format of the RR, based on the size of the RR, based on the timing (e.g., when the RR is sent by the WTRU) of the RR, and/or the like.

An RR may indicate a request for additional transmission resources and/or whether currently allocated resources are sufficient (e.g., with respect to data of a specific service or a logical channel, or with respect to a specific SOM). An RR may request additional resources dynamically (e.g., relative to a previous transmission). For example, a WTRU may transmit an RR in order to gain access to an additional resource that may be allocated shortly after or immediately following a previous transmission. An RR may request resources relative to an amount of currently allocated resources in the WTRU. For example, the WTRU may request and/or be configured with a specific amount of resources per unit of time (e.g., the resources may be guaranteed or reserved) for the WTRU's use for a finite period. Following configuration of such resources, the WTRU may send an RR (e.g., a new request) or an indication to reduce or increase the amount of resources already provided to the WTRU.

An indication in an RR may have a certain value. For example, the indication may take one of two possible values (e.g., a 1-bit value). The indication may take a first value if, for at least one PDU, the expected time of successful completion of transmission exceeds the current time plus the TTL of the PDU. The indication may take a second value otherwise. In another example, an indication in an RR may take one of four possible values (e.g., a 2-bit value). A WTRU may determine, for each PDU, the difference between the expected time of successful completion and the sum of the current time and the TTL of the PDU. The WTRU may set the value of the indication based on the highest such difference across all PDUs to be transmitted. The indication may be set to a first value if the difference exceeds a first threshold, to a second value if the difference exceeds a second threshold (but does not exceed the first threshold), to a third value if the difference exceeds a third threshold (but does not exceed the second threshold), and to a fourth value otherwise. The values of the thresholds may be pre-defined or signaled by a higher layer. Increasing the number of possible values for the indication may allow for a faster or more accurate adjustment of the allocated resources.

In certain options or for certain RR types, an RR may include information derived from QoS-related scheduling information as described herein. For example, a WTRU may transmit latency-related or any QoS-related information to a receiving node. The information may be transmitted in the RR, in a MAC PDU, or in an RRC signaling message. The information may be used by the network, for example, to schedule resources and/or prioritize among different WTRUs that require resources. The information that may be included (e.g., by a WTRU) in an RR may take on or be a function of one or more of the following forms.

A WTRU may include, in an RR, information associated with a TTL. For example, the WTRU may include a minimum TTL, or a TTL for a packet, a PDU, etc., that is currently queued at the WTRU for transmission. The WTRU may maintain multiple transmission queues that may be latency critical. The WTRU may transmit a TTL for each head-of-queue of the multiple transmission queues.

A WTRU may include, in an RR, information associated with a buffer size. For example, the WTRU may include the buffer size of data that are configured with a TTL requirement, the buffer size of data that can be multiplexed for the service(s) that triggered the request, or the buffer size of all of the data in the WTRU (e.g., together with their associated priority and/or requirements).

A WTRU may include, in an RR, information associated with a timing range for a specific packet, a PDU, etc., and/or their respective buffer sizes. For example, the WTRU may transmit minimum and maximum values for an acceptable latency range for a PDU or a set of data.

A WTRU may include, in an RR, information associated with an absolute time for transmitting/receiving a packet or an amount of data over the air, or a range of absolute times for acceptable latency. A WTRU may include, in an RR, information associated with a QoS class or an absolute priority of data, rate related information, and/or the expected time for successfully completing the transmission of at least one PDU (e.g., given currently allocated resources). The expected time may in turn be a function of one or more of the following. The expected time may be a function of an expected time at which the PDU can be included in a transport block submitted to the physical layer for a first time under a set of given prioritization rules. The expected time may be a function of an expected time for a retransmission. One of more of the parameters described herein may be set to a pre-defined value or be signaled by a higher layer.

A WTRU may include, in an RR, information associated with a specific TTI that the WTRU may use on resources (e.g., 2 symbol or 0.5 ms), the number of resource blocks per time unit (e.g., the number of resource blocks in a fixed period of x frames), and/or the frequency range in which such resources may be located (e.g., in a specific narrow bandwidth supported by the WTRU, or preferred by the WTRU due to radio characteristics of the WTRU).

A WTRU may indicate (e.g., implicitly indicate) specific RR-related information through the selection of resources, timing, encoding, power, and/or the like that are associated with transmission on PHY resources. For example, a WTRU may indicate the amount of additional resources to be allocated to the WTRU based on the time/frequency resource it uses to send the RR. RR-related information may be indicated by the format and/or transport mechanism used in RR transmission. The RR may be transmitted, for example, in the PHY layer (e.g., on a specific PHY control channel or piggybacked with data) and/or in the MAC layer (e.g., using a MAC CE and/or the like). The RR may be transmitted entirely in the PHY layer. When transmitted in the PHY layer, the RR may be transmitted via one or more of the following.

An RR may be transmitted using a single OFDM symbol or using a single symbol in one of the resource blocks associated with the WTRU's uplink transmission (e.g., at a pre-defined or configured location). In an example, the RR may be transmitted in the last symbol(s) (e.g., last symbol(s) in time) of the OFDM subcarrier that has the largest index or indices. The RR may be transmitted using an uplink control channel or as part of the WTRU autonomous scheduling information that may be transmitted in an uplink control channel.

An RR may be transmitted using dedicated PHY resources, the location of which may be provided to the WTRU via signaling in the network (e.g., RRC signaling) or obtained through information included in an access table sent to the WTRU. The RR may be transmitted (e.g., in conjunction with the foregoing) using identity or timing related information (e.g., to derive the location of PHY resources).

An RR may be transmitted using contention-based resources such a RACH or similar signaling. The contention-based resources may be spread over PHY resources being utilized by other WTRUs in such a way as to minimize the overall interference with those WTRUs (e.g., using CDMA or puncturing such that a few/small number of interfered resource elements associated with a specific WTRU are used). In an example case of LTE-assisted 5Gflex tight interworking, a WTRU may be configured to transmit an RR over the LTE PUCCH. The PUCCH SR may be extended to carry information that the request is related to with QoS characteristics that can be met by a 5G system. More specifically, the SR may indicate that the WTRU is requesting 5G resources. This may be enabled, for example, by changing the SR format to include an additional bit, by reserving special resources in which a SR-triggered 5G request is sent, and/or the like.

A WTRU may have access to multiple sets of resources or mechanisms for transmitting an RR. For example, for different services, the RRs may be defined with different characteristics including, for example, different formats or types, different values of time to transmit (e.g., time from triggering the request to transmitting the request over the air), different symbols, different signaling mechanisms, different transport formats, and/or the like. The WTRU may be able to select from these different mechanisms based on one or more of the following. The WTRU may select a mechanism for transmitting an RR based on the latency characteristics of the data in a queue or the data to be sent (e.g., the data may or may not be latency critical). The WTRU may select a mechanism for transmitting an RR based on the TTL of one or more packets or data to be sent (e.g., the TTL may or may not be relative to a threshold). The WTRU may select a mechanism for transmitting an RR based on the priority of data or service type. The WTRU may select a mechanism for transmitting an RR based on one or more of the QoS requirements described herein (e.g., time-based or rate-based QoS requirements). For example, the WTRU may send an RR for a service (e.g., ULLRC or eMBB) the PHY using different TTIs, for example, depending on the time criticality, priority, and/or timing requirements of the data in a buffer(s) for which the RR is sent/triggered.

An RR for a SOM (e.g., for each SOM) a given service or a logical channel may have different characteristics related to how the RR is transmitted in the PHY layer. In an example, the RR may be transmitted with different coding schemes, over different transport channels, using different TTIs and diversity/reliability, using dedicated (e.g., versus shared/contention-based) resources, and/or using other mechanisms/techniques. A WTRU may utilize different RR mechanisms depending on the SOM or service involved. For instance, a WTRU configured with a ULL service may employ a 1-bit PHY layer RR mechanism to request resources for the ULL service, while the WTRU may employ a MAC layer RR if a buffer status in conjunction with RR at the PHY layer indicates a request for IBB-type services.

A WTRU may trigger an RR based on one or more of the following. The WTRU may trigger an RR based on a QoS requirement (e.g., a QoS-related event) described herein. For example, the WTRU may trigger an RR based on a latency-related event. Such a latency-related event may comprise the arrival of a time critical packet at the MAC layer or a higher layer, for example. The WTRU may trigger an RR based on the TTL of one or more packets or data falling below a threshold. The WTRU may trigger an RR based on the initiation, configuration or reconfiguration of a service, a TRP, a logical channel, a SOM, and/or the like at the WTRU. The WTRU may trigger an RR based on the arrival of a packet with a different QoS class than an ongoing transmission. The WTRU may trigger an RR based on data not meeting rate-related QoS requirements, and/or the like.

A WTRU may trigger an RR based on one or more of the following. The WTRU may trigger an RR based on an indication from the application layer. The WTRU may trigger an RR based on periodic expirations of a timer. The WTRU may trigger an RR based on an indication that a buffer is no longer empty (or other buffer occupancy information). The WTRU may trigger an RR based on one or more HARQ entities indicating that retransmission is to be performed upon returning from sleep, DRX and/or the like. The WTRU may trigger an RR based on the initiation, configuration or reconfiguration of a service. The WTRU may trigger an RR based on the creation of a logical channel (e.g., a logical channel requiring low latency communication). The WTRU may trigger an RR based on the WTRU being connected to the network. With respect to the last example trigger event, if the network is an LTE assisted network and if new data arrives with requirements that cannot be met by LTE services, the WTRU may trigger a 5GFlex RR.

A WTRU may trigger an RR for a service or a logical channel while a transmission of data on a resource that is serving another service or another logical channel is ongoing or has started. In this scenario, the WTRU may perform one or more of the following actions, for example, based on a determination of priority, an amount of resources, and/or an amount of data to send (e.g., in absolute terms or based on current QoS characteristics for each service). The WTRU may append RR information to the ongoing data transmission or the WTRU may delay the transmission of the RR until the ongoing data transmission is completed. For time sensitive transmissions, however, RR delay may not be performed if the WTRU delays the transmission of the RR, or if the appended information is decoded by the network at the end of a TTI. The WTRU may immediately send the RR to the network. The WTRU may avoid transmitting the RR, and perform resource prioritization to address the new service that triggered the RR using existing resources.

To illustrate, a WTRU may have an ongoing web-browsing session and may have resources available for a transmission. If at that time the WTRU receives data with less stringent QoS requirements (e.g., time-related QoS requirements), the WTRU may transmit resource request information together with the data (e.g., using a MAC PDU or embedding the RR in the PHY layer). If the data received has strict QoS requirements or if a latency requirement is not being met, the WTRU may trigger the transmission of an RR using the RR characteristics associated with the service (e.g., the RR characteristic used for transmission of the RR may implicitly indicate the service to which the RR applies; the RR characteristics may be reflective of numerology, timing, resources, transmission techniques, and/or the like). In such a case, the WTRU may transmit the RR in parallel with the ongoing data transmission (e.g., on different resources), or the WTRU may delay the transmission of data to transmit the RR. For example, if the data arrives in the middle of an ongoing transmission and an RR is triggered, the WTRU may transmit (e.g., immediately transmit) the data in the first available resource. If the next available resource occurs at a later time than the time for transmitting the corresponding RR on the air interface, the WTRU may transmit the RR during an ongoing transmission. Mechanisms for transmitting an RR while the transmission of a longer TTI is ongoing and/or while RR specific resources are limited or unavailable are described herein.

In the example communication system described herein, a WTRU may obtain access to resources through a grant from the network. Whether to use granted resources may be an example of an operational aspect that may be varied when switching transmission schemes. The WTRU may receive one or more of the following in the grant. The WTRU may receive information (e.g., an indication) about resources that the WTRU may access. The resources may be specified as a pre-configured resource index or be explicitly signaled in the grant, for exmaple. The WTRU may receive information about a SOM or transport channel for which the grant is valid. For example, the information may indicate a numerology, a TTI, and/or a waveform that the WTRU may use. The WTRU may receive information about a logical channel, service type, priority, and/or the like that the WTRU may use for the given grant. The information may include an identifier or value that is commonly understood between the WTRU and the network. The WTRU may receive information about the transport format of the grant (e.g., such as MCS, block size, starting time, etc.). The WTRU may receive information about a TTI length. The WTRU may receive information about the validity of the grant. For example, the information may indicate a TTI or range of TTIs that the WTRU is allowed to use for the grant, period lengths, etc. The WTRU may receive information about a range of logical channel, priority, and/or service that is usable with the grant or that may be excluded from the grant. The range may be greater or less than a certain priority value (e.g., which may be indicated by the network in the grant).

A WTRU may prioritize the transmission of logical channels. Such prioritization of logical channel transmission may be an example of an operational aspect that may be varied when the WTRU switches transmission schemes. For example, the WTRU may utilize a grant to transmit a logical channel (e.g., any logical channel) that has a priority value less or greater than a value signaled in the grant, or is within a certain range (e.g., from a min value to a max value) signaled in the grant. Within the range of allowable priority values, the WTRU may exclude certain priority levels.

A WTRU may be configured to prioritize the use of granted resources. The prioritization of granted resources among various services may be an example of an operational aspect that may be varied when the WTRU switches transmission schemes. For example, the priority range of 5G services may include ten different priority levels associated with the scheduling and usage of granted resources, with level ten being the highest priority that may be associated with an ULLC service type. A WTRU may be configured to designate resources first for higher priority services (e.g., when those higher priority services have data to transmit). For example, a WTRU may receive a grant that is assigned a priority level of five. As such, the WTRU may be configured to utilize the grant (e.g., resources associated with the grant) for a transport block tagged with a priority level of five or higher, or for a transport block with the highest priority if the highest priority is less than five. The MAC layer, upon receiving an indication of the grant from the PHY layer, may select a packet in its transmission buffer with a priority level of five or higher, or with the highest priority if the highest priority is less than five, and may send that packet to the PHY layer for transmission.

A WTRU may be configured to tie resource prioritization to a specific type of resources at the PHY layer. Tying resource prioritization to resource types may be an example of an operational aspect that may be varied when the WTRU switches transmission schemes. For example, the WTRU may be configured to use a specific SOM only for a logical channel of a specific priority. To illustrate, a WTRU may receive a grant that has been assigned a priority level of five. The WTRU may be configured to utilize the grant (e.g., resources associated with the grant) for a transport block tagged with a priority level of five or lower. As such, the WTRU may be prevented from utilizing the resources associated with the grant for higher priority data (e.g., data with a priority level higher than five) since those resources may not be configured (e.g., with respect to reliability or timeliness) to accommodate data of higher priority levels.

A WTRU may be configured to exclude specific priority levels from the range of priority levels for which a granted resource may be used. The exclusion of specific priority levels may be an example of an operational aspect that may be varied when the WTRU switches transmission schemes. The specific levels that may be excluded by the WTRU may be defined through a specification or may be signaled to the WTRU. For instance, a priority level of ten may be excluded since the level may be associated (e.g., may be always associated) with the highest form of ultra-low latency communication, and as such may require a special type of resources that may be granted separately (e.g., by indicating the special priority level, or via a different mechanism).

A WTRU may be configured to autonomously access resources (e.g., preconfigured resources). Autonomous access of resources may be an example of an operational aspect that may be varied when the WTRU switches transmission schemes. A WTRU may be pre-configured with a set of transmissions that the WTRU may autonomously perform. Such a capability may be desirable, for example, in IoT applications, industrial applications, vehicular communications, and/or the like. In one or more of those scenarios, a WTRU may move from having few or no uplink transmissions for a long period of time to having regular (e.g., periodic) transmissions with very low latency. To start regular transmissions with low latency, the WTRU may be configured with a set of pre-configured resources. The WTRU may use one or more of these pre-configured resources to transmit data with certain QoS requirements. For example, the WTRU may be configured with resources for UL, DL, Sidelink, etc. Such configurations may not necessarily reserve resources for the WTRU, but may indicate to the WTRU which resources the WTRU may utilize when needed.

A preconfigured resource may include a static configuration of one or more overlapping or non-overlapping time-frequency resources. The resources may last a finite period of time and/or may occur with a certain periodicity. For example, one pre-configured resource may include a single resource block located at a specific frame or subframe number. A WTRU may receive pre-configured resources or request modification of pre-configured resources upon registration and/or connection to the network, via dedicated signaling from the network (e.g., similar to RRC signaling), via an access table (e.g., in association with the system signature), through the use of an identity corresponding to the WTRU or a service, and/or by establishing a service, a radio bearer, a logical channel and/or the like that may require such pre-configured resources.

A WTRU may gain access to a pre-configured resource through a short uplink transmission or via a transmission of an RR or scheduling information (SI), for example. Such an uplink transmission may include one or more of the following. The transmission may include a request to transmit. The transmission may include an index or an identifier that identifies the desired pre-configured resource in a pre-configured resource set. The transmission may include information that specifies the duration of use of the pre-configured resource (e.g., such as whether the WTRU wishes to use the resource once or periodically, the time duration for which the WTRU wants to use the resource, etc.). The transmission may include conditions that may potentially be used to define whether and/or when the pre-configured resource is no longer valid The transmission may include a request for an identifier/index and other timing-duration related information about the pre-configured resource The transmission may include time periods in which the WTRU may use a preconfigured resource. The transmission may include other information that may be carried in an RR or SI. The WTRU may be identified in the transmission, for example, by a WTRU specific RR or a SI resource, or by an explicit identifier as described herein.

Upon transmitting a request (e.g., an RR as described herein), a WTRU may start monitoring one or more control channels associated with the service or QoS class that triggered the request. For example, if transmission of low latency data is requested, the WTRU may initiate monitoring of one or more control channels associated with the low latency service, or the corresponding SOM. The WTRU may receive a confirmation in a timely manner (e.g., in ways similar to what is described herein). The WTRU may receive a response from the network after sending a short uplink transmission, as described herein. The WTRU may receive, from the response, either or both of the following: an index and/or timing related information that may be in the short uplink transmission, or an acknowledgement for the use of a resource. For example, the WTRU may perform a short UL transmission indicating a request for resources for a specific service or SOM. The network may respond with the index for the pre-configured resource. Depending on the pre-configuration conditions and/or the type of service requested, the pre-configured resource may be used for at least one transmission.

A WTRU may be provided with pre-configured resources in the downlink (DL). For example, a provision may be made using a response mechanism as described herein (e.g., the provision may be included in a response from the network). The WTRU may disable pre-configured resources (e.g., similarly to how pre-configured resources may be enabled). For instance, the WTRU may disable (e.g., implicitly) a pre-configured resource transmission through the transmission of an RR, e.g., when the amount of latency critical data in the buffer is below a threshold. Request for and/or enablement/disablement of pre-configured resources are examples of an operational aspect that may be varied when the WTRU switches transmission schemes.

A WTRU may perform an autonomous uplink transmission, for example using potential resources that may not necessarily be allocated to the WTRU. For such transmissions, the WTRU may enable the utilization of preconfigured resources and/or to inform the network that such resources are being utilized by the WTRU. Additionally or alternatively, the WTRU may perform the uplink transmission on a low-latency uplink control channel or via a low-latency data transmission (e.g., with a short TTI) that is assigned to the WTRU or dedicated for one or more WTRUs. Autonomous uplink transmission is an example of an operational aspect that may be varied when the WTRU switches transmission schemes.

A WTRU may perform an UL transmission for enabling a preconfigured resource via a MAC CE or other similar control messages over resources scheduled for uplink transmissions. The WTRU may perform the foregoing instead of sending the UL transmission autonomously. Using scheduled resources to enable preconfigured resources may be an example of an operational aspect that may be varied when the WTRU switches transmission schemes.

The WTRU may transmit a request for pre-configured resources, or an indication to use preconfigured resources via any suitable technique described herein. For example, the WTRU may transmit the request or indication in a manner similar to transmitting an RR. For example, the WTRU may enable a preconfigured resource via an RR (e.g., based on the content of the RR). The WTRU may enable a preconfigured resource explicitly, for example, by sending an RR to indicate a desired resource configuration. The WTRU may enable a preconfigured resource implicitly, for example by including a QoS related parameter in an RR that may be interpreted as an automatic request for a specific type of resource configuration. The WTRU may implicitly enable the use of a pre-configured resource upon transmission of an RR comprising specific triggering conditions. Such conditions may be part of an initial pre-configuration of the pre-configured resource itself. For instance, the WTRU may be configured to utilize the pre-configured resource upon transmission of an RR that indicates an amount of latency critical data that is above a specific threshold.

A WTRU may be configured to perform the uplink transmission described herein using one or more of the following mechanisms. The WTRU may be configured to perform the uplink transmission using a short PHY layer signal reserved for one or more WTRUs to signal the network. The WTRU may be configured to perform an uplink transmission using a CDMA-like signal or a punctured signal sent over a channel shared among multiple WTRUs. The WTRU may be configured to perform an uplink transmission using a RACH-like uplink transmission performed at specific, well-defined time instances. The WTRU may be configured to perform an uplink transmission via an initial transmission on one of the resources associated with a pre-configured resource. Network transmissions in the downlink (e.g., which may include an ACK or an indication) may be performed using a low-latency control channel, a data channel with a short TTI, or another suitable DL channel.

A WTRU may be allocated resources to transmit data for one or more services. The WTRU may dynamically schedule (e.g., via self-scheduling) data transmission using all or a subset of the allocated resources. The allocated resource may be constrained within one or more specific windows in the time domain (e.g., such time windows may have a duration of a few to several milliseconds). In certain embodiments, the one or more time windows may recur periodically (e.g., substantially periodically). The allocated resources may be constrained within a certain range in the frequency domain. The range of frequencies may be a function of time (e.g., to provide frequency diversity). The allocated resources may be used by at least one uplink physical channel (UPCH) on which the WTRU may transmit data and control information. The allocated resources may be used by one or more sidelink physical channels (SPCHs). Resources may be allocated based on service type (e.g., for each type of services) such that some resources may be reserved for certain types of services.

A WTRU may be allocated resources to transmit scheduling information (SI), other uplink control information (UCI), and/or sidelink control information (SCI). These information may include, for example, HARQ-ACK and/or CSI feedback. It should be noted that the discussion herein with respect to SI may be applicable to a resource request (RR) (e.g., an RR may be regarded as a type of SI and be referred to interchangeably with SI; e.g., examples described in terms of SI may also be applicable to RR and vice versa). Similarly, the discussion herein with respect to an RR may be applicable to SI. For example, while the foregoing discusses resource allocation for transmitting SI, a person skilled in the art will understand that the mechanism may be applicable to the transmission of an RR. The resources allocated for the transmission of SI and/or other UCI/SCI may be part of the block of resources allocated for self-scheduling operations, or may be allocated separately. In certain embodiments, the resources may be made available to transmit data. The transmission of SI and/or other UCI/SCI may take place on a specific physical control channel (e.g., an uplink or sidelink physical control channel). The SI and/or other UCI/SCI may be encoded and multiplexed (e.g., in-band) in an uplink or sidelink physical channel (e.g., along with data).

Resource allocation for the transmission of SI and/or other UCI/SCI may be configured to occur at regular intervals, such as at every shortest applicable TTI, so as to provide frequent opportunities for transmission. Resources used for the transmission of a single instance of SI may occupy a full range in the frequency domain of the allocation. This way, the number of time symbols configured for transmitting one instance of SI may be reduced (e.g., minimized). The SI may be jointly encoded with other UCI/SCI. The SI and/or other UCI/SCI may be separately encoded and multiplexed (e.g., concatenated) prior to modulation, layer mapping and/or resource element mapping. The coding rate, coding scheme and/or modulation may be determined using one or more of the techniques described herein.

A WTRU may transmit information about the parameters associated with the transmission of SI and/or UCI/SCI. Such information may help a receiving node, such as a network node or another WTRU, decode the SI and/or UCI/SCI. For example, a WTRU may specify the number of information bits, the modulation and coding scheme, and/or resource information (e.g., the number of time symbols) associated with the SI and/or UCI/SCI. Such information may be encoded separately from the SI and/or UCI/SCI, and/or may be mapped to a known portion of an allocated resource. The WTRU may include an indication (e.g., for each time symbol that includes SI and/or UCI/SCI) of whether the next time symbol includes SI and/or UCI/SCI.

A WTRU may transmit data in one or more TTIs. The WTRU may transmit data for one or more services, one or more logical or transport channels, and/or one or more receivers (e.g., network nodes or other WTRUs). The WTRU may include information associated with the data in SI (e.g., an instance of SI) to help the one or more receivers decode the data. The instance of SI may be transmitted prior to the data transmission in the one or more TTIs. The transmission of SI may be in accordance with a fixed timing relationship.

A WTRU may indicate in SI whether or not a transmission of data is taking place in a TTI. For example, the SI may indicate one or more of the following about a TTI or an applicable type of transmission within the TTI. The SI may indicate whether data is transmitted in the TTI. The SI may indicate the type of data, service or logical channel included in the transmission. The SI may include a timing indication for the TTI (e.g., how many time units from the SI instance). The SI may indicate the duration of the TTI. The SI may indicate an identifier for the WTRU (e.g., such as a RNTI). The SI may include an indication of the destination node (e.g., such as a network node (TRP) or another WTRU). The SI may indicate a Cyclic Redundancy Check (CRC) such as a CRC combined or masked with another field such as the identifier of the WTRU. The SI may indicate the number of codewords. The SI may indicate power-related information (e.g., such as a power headroom). The SI may indicate other control information such as scheduling requests and/or buffer status reports, HARQ-ACK or CSI feedback, and/or transmit power control command.

A WTRU may indicate in SI a description of how information is transmitted for a codeword. The description may in turn include one or more of following. The description may include a transport channel type. The description may include a coding type such as convolutional or turbo. The description may include a modulation and coding scheme (MCS). The description may include HARQ information such as new data indication (NDI), process identity, and/or retransmission sequence number. The description may include frequency/time allocation within allocated resources or within a TTI. The description may include spatial processing information such as transmit diversity or spatial multiplexing schemes and/or the number of transmission layers. The description may include antenna ports, and/or reference signal information.

A WTRU may use a single field to signal or indicate more than one of the parameters described herein, e.g., to reduce overhead. For example, a field may indicate a combination of MCS and coding type or transport channel type. A mapping between combination values and values of the corresponding parameters may be pre-defined or configured by a higher layer. A WTRU may use one or more of the following techniques to schedule a transmission, and/or set a parameter pertaining to the transmission.

A WTRU may be configured to multiplex transmissions in a frequency or space domain. For instance, a WTRU may prioritize the transmission of data based on the type of service and/or other parameters such as TTL, as described herein. The WTRU may apply the priority in such a way that the start time of higher priority data is earlier than that of lower priority data. The WTRU may transmit data of different priorities during the same time interval (e.g., under a condition that all data of higher priority can be transmitted during the time interval). In such a case, higher priority data may be transmitted using a fraction of the available resources in the power, frequency and/or space domain.

Available resources may be split in the frequency domain. A WTRU may allocate as much frequency resources to higher priority data as needed, and use the remaining resources to transmit data of lower priority. The WTRU may determine frequency allocation for a transmission (e.g., for each transmission) according to pre-defined rules. For example, the WTRU may allocate either the highest or the lowest frequency first. The allocation may be based on frequency-selective channel quality feedback from a receiver and/or based on priorities of the transmission. The WTRU may allocate the portion of frequency with higher channel quality to higher priority transmissions first. For instance, the WTRU may have received an indication from a network node that a first portion of the frequency range allocated for self-scheduling operations has higher quality than a second portion. In such a case, the WTRU may perform a higher priority transmission using at least the first portion of the frequency range.

If spatial multiplexing can be used, the WTRU may allocate as many transmission layers to higher priority data as needed, and use the remaining spatial layers to transmit lower priority data. The WTRU may determine layer selection for a transmission (e.g., for each transmission) according to pre-defined rules or based on layer-specific channel quality feedback from a receiver, for example.

A WTRU may select transmission power, a MCS, and/or a spatial transmission scheme according to one or more adaptation principles. For example, the WTRU may configure and reconfigure (e.g., adjusted) transmission power. Such transmission power may be expressed, for example, as a ratio of the maximum transmission power. The WTRU may configure and reconfigure (e.g., adjust) the transmission power based on physical layer signaling, higher layer signaling, or a combination thereof. To assist with the configuration and re-configuration (e.g., adjustment), the WTRU may transmit reference signals at a configured power level or using a power level signaled by the network. The WTRU may use a same transmission power for one or more resource blocks (e.g., for each resource block). The transmission power may be configured on a resource block basis such that the total transmission power may be dependent on the number of resource blocks on which the transmission takes place.

A WTRU may receive an indication of a MCS and/or a coding type to use with a specific type of data. For example, the WTRU may receive an indication of a first coding type (e.g., convolutional coding), a first modulation and coding scheme (e.g., QPSK and rate 1/3), and/or a first spatial transmission scheme (e.g., transmission diversity such as SFBC) to use for a first type of service (e.g., URLLC). The WTRU may receive an indication of a second coding type (e.g., turbo), a second modulation and coding scheme (e.g., 16-QAM and rate 1/2), and/or a second spatial transmission scheme (e.g., spatial multiplexing of rank 2) to use for a second type of service (e.g., eMBB).

A WTRU may select a MCS and/or a coding type as a function of channel quality feedback from a receiver and/or as a function of the type of data to be transmitted. For example, for a given value of channel quality feedback from the receiver, the WTRU may select a first coding type, a first modulation and coding scheme, and/or a first spatial transmission scheme if the data to be transmitted corresponds to a first type of service (e.g., URLLC). The WTRU may select a second coding type, a second modulation and coding scheme, and/or a second spatial transmission scheme if the data to be transmitted corresponds to a second type of service (e.g., eMBB). A mapping between channel quality feedback values and the MCS and/or coding type to use for a specific type of service may be configured by a higher layer.

A WTRU may receive indications of channel quality, MCS and/or code type via physical layer signaling. For example, the indications may be signaled in downlink control information along with other parameters that allocate resources for self-scheduling operations. The indications may be signaled on a regular basis (e.g., at an interval that may be in the order of several TTIs).

A WTRU may adjust its selection of MCS, transmission scheme, and/or transmission power based on a dynamic indication applicable to a TTI. The WTRU may receive such an indication from a network via physical layer signaling. For example, a WTRU may select a more conservative MCS level and/or transmission scheme if the indication is set to a first value, and may apply a less conservative MCS and/or transmission scheme if the indication is set to a second value. Using the indication, the network may adjust the robustness of transmission, e.g., based on whether another WTRU is expected to use the same resources in the TTI (e.g., in the case of multi-user MIMO). Using the indication, the network may increase the robustness of transmission after a certain number of HARQ retransmissions. The WTRU may map various indications to MCS/transmission scheme combinations. The combinations of MCS's and transmission schemes may be ranked from the least conservative to the most conservative. For example, the WTRU may store such ranking in a table and an indication may be mapped to an offset that is linked to one or more entries of the table. The offset may be configured by a higher layer and/or be dependent on service type or transport channel.

A WTRU may adjust its selection of MCS, coding type, and/or transmission power based on the number of retransmissions performed, a delay since an initial transmission of data, and/or a TTL of the data. For example, the WTRU may apply a more conservative MCS level and/or transmission scheme when the TTL of the data carried by a transmission falls below a threshold. The adjustment may comprise an offset applied in a table of MCS's and/or transmission schemes. The adjustment may result in allocating a larger portion of allocated resources to a transmission while increasing the transmission's robustness and probability for successful completion. The WTRU may increase transmission power by an offset when the TTL of the data falls below a threshold.

A WTRU may be configured to transmit to more than one receiver (e.g., using more than one MAC instance and/or at the same time). In an example, a first MAC instance may correspond to a transmission to a first network node, and a second MAC instance may correspond to a transmission to a second network node. In an example, a first MAC instance may correspond to a transmission to a network node, and a second MAC instance may correspond to a transmission to another WTRU. The MCS and/or coding type applicable to a transmission (e.g., to each transmission) may be dependent on the channel quality feedback and/or other indications provided by a receiver.

Resources may be configured for self-scheduling operations. For one or more types of services (e.g., for each type of services), these resources may include one or more of the following. The resources for self-scheduling may include resources for the transmission of data and/or control information (e.g., SI and/or SCI/UCI). The resources for self-scheduling may include resources for the reception of control information (e.g., downlink or sidelink control information such as channel quality feedback, HARQ feedback and/or other indications). The resources for self-scheduling may include parameters for link adaptation (e.g., such as transmission power, offsets for adjustments of power, MCS, and/or transmission schemes). The resources for self-scheduling may be configured by a higher layer or by a combination of physical layer signaling and higher layer signaling. For example, a WTRU may receive a field, e.g., via downlink control signaling from a physical control channel, that may be mapped to a set of parameters associated with the configuration of resources for self-scheduling. Such mapping may be configured by a higher layer.

A WTRU may have access to resources dedicated for a specific type of services (e.g., such as URLLC). Such resources may be common to (e.g., shared by) multiple WTRUs. The multiple WTRUs may transmit URLLC data (e.g., at least occasionally). The dedicated resources may comprise specific time/frequency resources such as specific resource blocks or subcarriers. The resources may be used for a given set of frames or subframes, or over a long period of time. The WTRU may determine the resources dedicated to a specific service (e.g., for URLLC) based on broadcast or dedicated signaling by the network, or through an access table, for example.

A WTRU may be capable of autonomously transmitting on dedicated PHY resources. For example, the WTRU may be configured to perform such autonomous transmissions when dedicated PHY resources are reserved for the WTRU (e.g., only for the WTRU). The WTRU may receive an ACK from the network over a low-latency downlink control channel. For example, the ACK may be sent over a control channel. The ACK may be sent within the same subframe as an indication, and/or through the use of a shortened TTI. The ACK may include an indication of what resources are to be used. The ACK may be sent over dedicated symbols within certain time frequency space (e.g., time frequency space may be reserved for this specific purpose). For example, a set of symbols may be set aside for a WTRU (e.g., each WTRU) for receiving a downlink ACK. Such symbols may serve other purposes (e.g., the symbols may serve as reference symbols), for example on the subframes or TTIs in which the WTRU is not expecting a response from the indication.

A WTRU may be configured with resources at the PHY layer that may be used (e.g., specifically reserved) for transmissions with shortened TTIs. For instance, specific time/frequency resources (e.g., x resource blocks for every y subframes) may be reserved for the WTRU to perform shortened TTI transmissions (e.g., 2 OFDM symbols). The WTRU may determine the resources reserved for shortened TTI transmissions using one or more of the following example techniques. The resources may be statically defined for the WTRU. The resources may be signaled by the network through dedicated signaling or via an access table. The resources may be defined/created (e.g., implicitly) based on the WTRU's device type, based on service type, and/or based on the type of traffic currently managed by the WTRU. The WTRU may be configured to select the resources autonomously.

Figure 5:
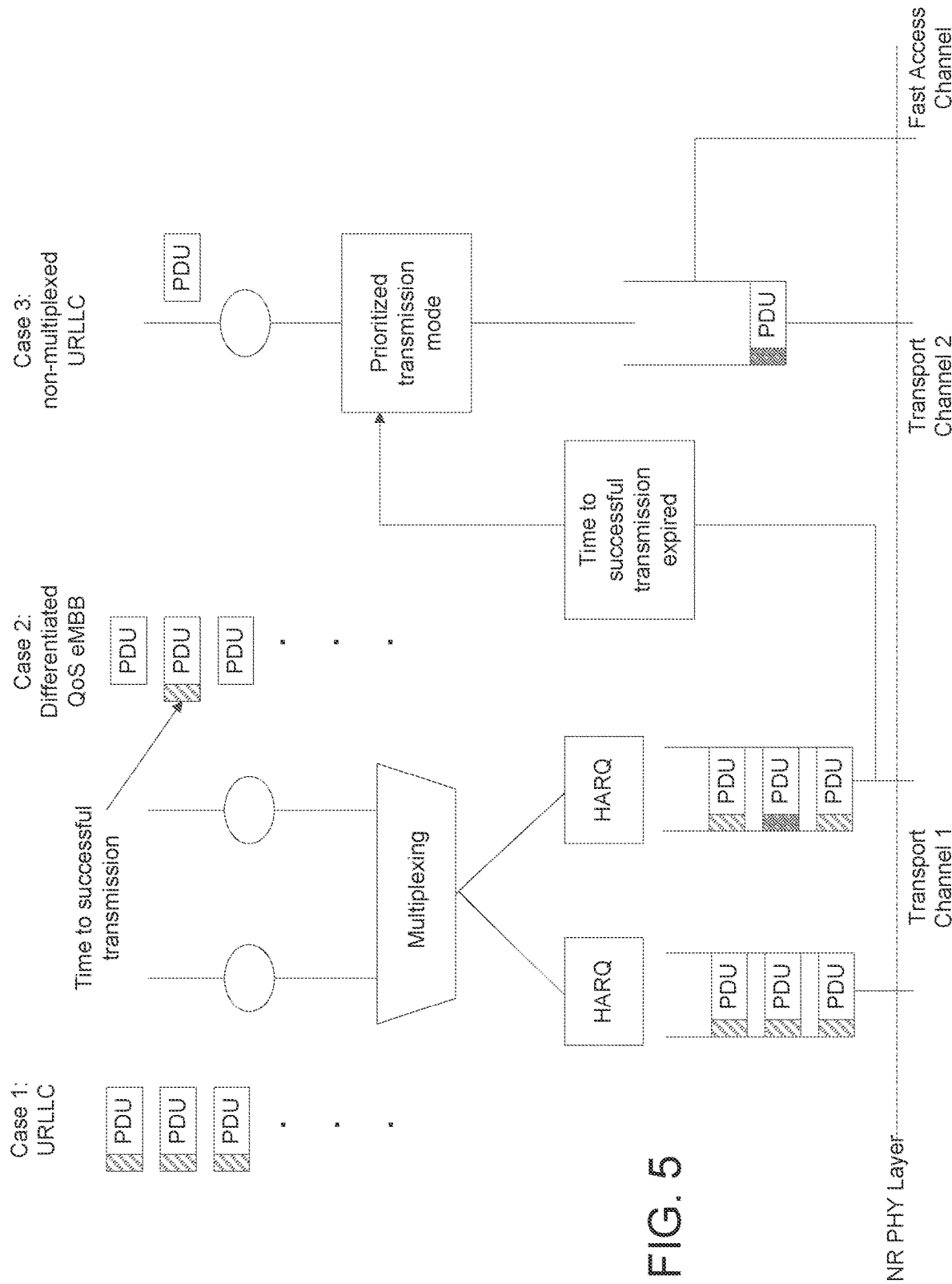
FIG. 5 is an illustration of an example of prioritized transmissions.

Certain types of transmissions may be prioritized over others. FIG. 5 illustrates an example of prioritizing transmissions. Such transmission prioritization may be applied in various use cases including those involving URLLC transmissions, differentiated QoS eMBB transmissions, non-multiplexed URLLC transmissions, and/or the like. Transmission prioritization may be realized, for example, based on one or more of the following. Transmission prioritization may be realized via request differentiation. Transmission prioritization may be realized via transport channel selection. Transmission prioritization may be realized via re-association of transmission resources to high priority HARQ and/or different transport channels. A prioritized transmission may indicate and/or utilize a specific numerology. A prioritized transmission may include a PDU configured with a maximum allowed time for successfully completing the transmission (e.g., such as in the case of URLLC transmissions or differentiated QoS eMBB transmissions). A prioritized transmission may include a PDU associated with a specific logical channel (e.g., such as in the case of non-multiplexed URLLC transmission).

As described herein, the example communication system may support low-latency communications. A WTRU may be configured to transmit low-latency packets immediately or with a processing delay (e.g., a shortest possible delay) at the MAC/PHY layers. A WTRU may be configured to delay transmissions that are already in process, that have been canceled, and/or that have been terminated to give priority to low latency packets. In an example scheme for prioritizing low latency communications, a WTRU about to perform a scheduled uplink transmission may autonomously decide to delay the scheduled transmission and utilize resources allocated to the scheduled transmission to transmit or retransmit a transmission with a low-latency requirement.

Examples of transmissions that may be delayed by a WTRU may include a dynamically scheduled uplink transmission, a semi-persistent transmission or a static uplink granted transmission, a scheduled retransmission, and/or the like. In an example, a WTRU having multiple ongoing HARQ processes may suspend one of the HARQ processes to allow transmission of low-latency data. In an example, a WTRU may suspend a transport block or a transmission that is to be retransmitted, and utilize the resources intended for the retransmission to perform an initial transmission of a transport block or data with low latency requirements. In an example, a WTRU may have received a grant associated with a transmission of a specific priority, a logical channel, and/or a service, and the WTRU may decide to utilize the resources intended for the granted transmission to transmit a low latency packet. For example, a low latency packet may arrive at the MAC layer after a request and a corresponding grant for non-low-latency resources were made. In such a scenario, the WTRU may send an indication to the network regarding the non-low-latency transmissions for which resources are currently reserved, and a different service, priority or logical channel for which the WTRU intends the resources to be used instead. The indication may be transmitted using a format and/or technique described herein.

A WTRU may, upon deciding to delay a transmission such as a non-low-latency transmission, transmit an indication to the network that the transmission has been delayed in favor of another transmission (e.g., a low-latency transmission). The indication may indicate that a grant or resource allocation is being overwritten. The indication may indicate the HARQ ID or process associated with the data being delayed. The indication may indicate the HARQ ID or process associated with the new data. The indication may indicate resources, locations, and/or procedures that may be used to retransmit the delayed data. The indication may be provided in the UCI/SCI, SI, and/or RR, as described herein. The indication may include the type of the data being delayed or to be transmitted. For example, the WTRU may indicate that a transmission is a low-latency transmission, and should be processed accordingly. The WTRU may indicate the transport format (e.g., MCS, coding, etc.) of the data being transmitted and/or the PHY layer parameters being used to transmit the data over the same resources (e.g., a TTI parameter). A network may, upon receiving the indication, suspend HARQ processing for a particular HARQ process that was interrupted. The network may resume the HARQ processing once transmission of the low-latency transport block is completed successfully.

Upon prioritizing a new transmission (e.g., a low-latency transmission) over an original transmission, a WTRU may utilize the same modulation and/or coding technique that was intended for the original transmission for the new transmission. Alternatively, the WTRU may select a new TTI, modulation and/or coding technique for the new transmission to allow the WTRU to transmit the new transmission within the same resources or within parts of the same resources.

The WTRU may send the indication described above to the network using a subset of the resources allocated to the WTRU. For example, WTRU may send the indication in a transport block, in a set of resource elements, or in a set of subcarriers. The subset of resources may be predefined for such a purpose. To illustrate, a WTRU may use the first N subcarriers of a first transport block to send the indication. The WTRU may additionally transmit a predefined sequence to signal to the network that the indication is present. Such a technique may allow the network to first decode dedicated resource elements to determine the presence of a predefined sequence, a suspension indication, physical layer parameters, and/or the like.

Additionally or alternatively, a WTRU may send the indication described above on a separate control channel such as a control channel used for UL low latency control communication. The WTRU may send the indication on a different set of resources that have a shortened TTI. A network may be configured to decode the information transmitted by the WTRU blindly. The WTRU may use a UCI/SCI, a UL control channel, SI, or an RR to carry new scheduling information and/or to indicate new HARQ information, new physical layer parameters, new SOMs, and/or new TTIs. The WTRU may transmit the relevant information and/or select the relevant parameters using one or more of the techniques described herein.

A WTRU may be configured to transmit an RR, SI, and/or low latency data while another transmission is ongoing. If an RR is triggered while another transmission is ongoing, the WTRU may transmit the RR in the middle of the ongoing transmission. Within a TTI, certain symbols and/or resources may be reserved for transmitting an RR for time critical data. The WTRU may transmit the RR and/or SI using a CDMA-like signal. The WTRU may puncture the time critical data and embed the RR request in the data signal or channel. A receiving entity of the data may receive notification that the data has been punctured.

When a data transmission is interrupted by an RR and/or time critical data, a number of bits (e.g., all bits subsequent to the interruption) may be dropped. A WTRU may embed information in a signal to indicate to a receiving entity that data from a previous transmission were dropped and a new transmission has been started, or that an RR/SI is being transmitted. The WTRU may notifying the receiving entity (e.g., a network) that data (e.g., all data subsequent to an interruption) were dropped. To handle time critical data, a WTRU may drop a packet from its transmission buffer or drop a packet it receives from an upper layer before the packet is processed by the RAN. The WTRU may be configured to drop packets at any layer. For example, a packet may be dropped when it is received from a higher layer. As another example, a specific layer at the WTRU may drop an SDU that the WTRU received from a layer above.

When dropping a packet, a WTRU may perform one or more actions. The WTRU may re-adjust the sequence numbering so that the dropped packet and/or SDU does not occupy a specific sequence number. The WTRU may send a specific indication (e.g., a MAC CE or a similar control message) with the transmission to provide an indication of the dropped packet to the network. Example conditions under which a packet may be dropped may include one or more of the following. The WTRU may drop a packet or SDU when the packet or SDU arrives later than an expected delivery time. For example, the expected delivery time may have already expired when the packet or SDU arrives. The WTRU may drop a packet or SDU when an expected processing time (e.g., as expected by the current layers and/or layers below) of the packet or SDU may cause an expected delivery time of the packet or SDU to expire before transmission. The WTRU may drop a packet or SDU when the packet or SDU is associated with a logical channel, a flow, and/or a service on which packet dropping is allowed. The concerned logical channel, flow, and/or service may be configured upon initiation to allow packet dropping. The WTRU may drop a packet or SDU when the packet or SDU is multiplexed together with other packets that have time critical latency requirements, and the packet or SDU itself does not have time-critical latency requirements.

A WTRU may be configured to transmit an indication to a lower layer, an upper layer, or an application layer that a packet was dropped. For example, the WTRU may be configured to transmit an indication to the PHY layer in order to increase the amount of resources available for transmission. For example, the WTRU may be configured to notify an application layer about potential incorrect operations.

The example communication system described herein may utilize a number of MAC CEs or MAC layer control messages for MAC layer control signaling. One example of such messages may be associated with TRP modification, including, for example, TRP handover, switching, addition, activation, and/or deactivation. A network may be configured to send such a message to instruct a WTRU to move from Tx/Rx on one TRP to Tx/Rx on another TRP. The message may instruct a WTRU to initiate combined TX/RX to two different TRPs. The message may comprise one or more of the following fields: target TRP identifier, target TRP configuration (e.g., resource, power, timers, etc.), target TRP carrier frequency and bandwidth, target TRP RACH or WTRU-autonomous transmission configuration, and/or timing alignment. A WTRU may be previously configured with a target TRP configuration and may receive an index and/or a subset of the configuration for accessing the TRP.

Another example MAC CEs or MAC layer control message may be associated with a TRP connection request. A WTRU may be configured to send such a message to request connection to a specific TRP. The message may include WTRU identification information, a list of logical channels and/or services, a reason for the connection request, and/or the like.

Another example MAC CEs or MAC layer control message may be associated with a TRP measurement list (e.g., the message may comprise a TRP measurement list). A network may be configured to provide the WTRU with a list of TRPs that the WTRU should measure. For example, the WTRU may be instructed to measure the DL quality related to the list of TRPs. The network may be configured to provide the WTRU with a list of TRPs from which the WTRU should measure a positioning reference signal (PRS) (e.g., for determining the position of the WTRU). The network may be configured to provide the WTRU with a list of TRPs to which the WTRU should maintain UL timing alignment at a given time. The message comprising the TRP measurement list may include one or more of the following fields: a message type, a list of TRP identifications (e.g., an index or similar identifier for each TRP), and/or a threshold associated with a TRP (e.g., with every TRP). In an example, information associated with the TRP measurement list may be provided as part of the RR and/or SI information.

Another example MAC CEs or MAC layer control message may be associated with cross-TRP scheduling configuration. A network may be configured to send such a message to a WTRU to configure a semi-static cross-TRP scheduling configuration, for example. The message may include one or more of the following fields: source TRP identification, target/destination TRP identification, and/or resource mapping between source and destination resources.

Another example MAC CEs or MAC layer control message may be associated with the location of a TRP. A network is configured to send such a message to a WTRU to provide respective locations of the TRPs that are in the vicinity of the WTRU. The message may include one or more of the following fields: the identification of the TRPs in the vicinity of the WTRU, the system signature used by the TRPs, and/or the respective locations of the TRPs.

Another example MAC CEs or MAC layer control message may be associated with a timing alignment request. A WTRU may be configured to send such a message to a network to request the network to provide to the WTRU with UL timing alignment and/or to start a timing alignment procedure. The message may include one or more of the following fields: request to enable/disable timing alignment, and the SOM in which timing alignment is requested.

Another example MAC CEs or MAC layer control message may be associated with enhanced timing advance. The message may include one or more of the following fields: an identifier of a TRP, a timing offset associated with each TRP, a timing offset associated with each SOM, and/or an indication of allowed/disallowed techniques for uplink timing alignment.

Another example MAC CEs or MAC layer control message may be associated with an enhanced buffer status report. The message may include one or more of the following: a logical channel ID or logical channel group ID, number of bytes in a queue, priority of data, QoS class, one or more pieces of information associated with an RR, transport channel type, number of bytes in a queue having a TTL lower than a first threshold, and/or number of bytes in a queue having a TTL above a threshold, but below a second threshold. Different MAC CE may be defined for different RR types. A MAC CE may comprise a header indicating what RR type the MAC CE corresponds to.

Another example MAC CEs or MAC layer control message may be associated with a dropped packet indication.

Such a message may be sent by a WTRU to a network or by a network to a WTRU to inform a SDU sequencing entity in the WTRU or in a network scheduler of a packet dropping in the sequencing. The message may include one or more of the following fields: a logical channel or flow on which the packet was dropped and/or an index of the dropped packet (e.g., or indices of a range of dropped packets).

Another example MAC CEs or MAC layer control message may be associated with a SPS configuration. A network may be configured to send such a message to a WTRU to configure and/or reconfigure semi-persistently scheduled resources (e.g., which may be pre-configured) in the WTRU. The message may include one or more of the following fields: a resource identification (e.g., time, frequency, duration, periodicity, etc.), usage restrictions, an identifier for a resource or identifiers for a collection of resources (e.g., several resource may be configured), and/or the SOM associated with the resource or collection of resources.

Another example MAC CEs or MAC layer control message may be associated with SPS resource enabling or disabling. A WTRU may be configured to send such a message to a network to enable or disable a pre-configured SPS resource or a collection of SPS resources. The message may include one or more of the following fields: an indication to enable or disable SPS and/or an identifier for the resource or resource collection.

Another example MAC CEs or MAC layer control message may be associated with a resource request, a resource increase or decrease, and/or a resource indication. A WTRU may be configured to send such a message to a network to indicate a request to the network for a specific type of resources (e.g., a short TTI resource), to request an increase or decrease in the amount of such allocated resources over time, and/or to indicate to the network that the WTRU is currently utilizing or intends to utilize a specific resource. The message may include one or more of the following fields: a message type, a SOM identification, an increase/decrease amount, an amount of resources requested, and/or the type of resources and/or restrictions.

Another example MAC CEs or MAC layer control message may be associated with connection reconfiguration. A network may be configured to send such a message to a WTRU to reconfigure a specific connection to a TRP. The message may include one or more of the following (e.g., for each SOM connected to the TRP): new radio configuration, resource configuration, power configuration, timer configuration, and/or the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU), comprising:
a processor configured to:
receive information indicating an uplink transmission grant for the WTRU and a priority associated with the uplink transmission grant;
determine that data associated with a first logical channel is available for transmission;
determine that the priority associated with the uplink transmission grant matches a priority associated with the first logical channel;
determine, based on the priority associated with the uplink transmission grant matching priority associated with the first logical channel, the data associated with the first logical channel is to be transmitted using the uplink transmission grant; and
transmit the data associated with the first logical channel using the uplink transmission grant.

2. The WTRU of claim 1, wherein the processor is further configured to receive configuration information that indicates the priority associated with the first logical channel.

3. The WTRU of claim 1, wherein the determination that the data associated with the first logical channel is to be transmitted using the uplink transmission grant is based further on a determination that a subcarrier spacing associated with the uplink transmission grant is among one or more subcarrier spacings associated with the first logical channel.

4. The WTRU of claim 1, wherein the determination that the data associated with the first logical channel is to be transmitted using the uplink transmission grant is based further on a transmission timing parameter associated with the uplink transmission grant.

5. The WTRU of claim 1, wherein the processor is further configured to determine that data associated with a second logical channel is available for transmission and determine, based on at least the priority associated with the uplink transmission grant and a priority associated with the second logical channel, that the data associated with the second logical channel is not to be transmitted using the uplink transmission grant.

6. The WTRU of claim 5, wherein the processor is further configured to transmit a scheduling request (SR) to a base station in response to determining that the data associated with the second logical channel is not to be transmitted using the uplink transmission grant.

7. The WTRU of claim 6, wherein the SR is transmitted to the base station using one or more SR resources configured for the second logical channel.

8. The WTRU of claim 7, wherein the processor is further configured to receive configuration information that indicates the one or more SR resources configured for the second logical channel.

9. The WTRU of claim 1, wherein the information that indicates the uplink transmission grant and the priority associated with the uplink transmission grant is received via a downlink control channel.

10. A method implemented by a wireless transmit/receive unit (WTRU), the method comprising:
receiving information indicating an uplink transmission grant for the WTRU and a priority associated with the uplink transmission grant;
determining that data associated with a first logical channel is available for transmission;
determining that the priority associated with the uplink transmission grant matches a priority associated with the first logical channel;

determining, based on the priority associated with the uplink transmission grant matching priority associated with the first logical channel, the data associated with the first logical channel is to be transmitted using the uplink transmission grant; and transmitting the data associated with the first logical channel using the uplink transmission grant.

11. The method of claim 10, further comprising receiving configuration information that indicates the priority associated with the first logical channel.

12. The method of claim 10, wherein the determination that the data associated with the first logical channel is to be transmitted using the uplink transmission grant is based further on a determination that a subcarrier spacing associated with the uplink transmission grant is among one or more subcarrier spacings associated with the first logical channel.

13. The method of claim 10, wherein the determination that the data associated with the first logical channel is to be transmitted using the uplink transmission grant is based further on a transmission timing parameter associated with the uplink transmission grant.

14. The method of claim 10, further comprising determining that data associated with a second logical channel is available for transmission and determining, based on at least the priority associated with the uplink transmission grant and a priority associated with the second logical channel, that the data associated with the second logical channel is not to be transmitted using the uplink transmission grant.

15. The method of claim 14, further comprising transmitting a scheduling request (SR) to a base station in response to determining that the data associated with the second logical channel is not to be transmitted using the uplink transmission grant.

16. The method of claim 15, wherein the SR is transmitted to the base station using one or more SR resources configured for the second logical channel.

17. The method of claim 16, further comprising receiving configuration information that indicates the one or more SR resources configured for the second logical channel.

18. The method of claim 10, wherein the information that indicates the uplink transmission grant and the priority associated with the uplink transmission grant is received via a downlink control channel.

\* \* \* \* \*